(12) United States Patent
Wang et al.

(10) Patent No.: US 12,244,397 B2
(45) Date of Patent: Mar. 4, 2025

(54) REPETITIVE COMMUNICATIONS FOR IMPROVING RELIABILITY OF SATELLITE COMMUNICATIONS

(71) Applicant: Google LLC, Mountain View, CA (US)

(72) Inventors: Jibing Wang, San Jose, CA (US); Erik Richard Stauffer, Sunnyvale, CA (US); Aamir Akram, San Jose, CA (US); Sharath Ananth, Cupertino, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 18/252,500

(22) PCT Filed: Nov. 1, 2021

(86) PCT No.: PCT/US2021/057594
§ 371 (c)(1),
(2) Date: May 10, 2023

(87) PCT Pub. No.: WO2022/103616
PCT Pub. Date: May 19, 2022

(65) Prior Publication Data
US 2024/0014934 A1    Jan. 11, 2024

Related U.S. Application Data

(60) Provisional application No. 63/183,499, filed on May 3, 2021, provisional application No. 63/112,378, filed on Nov. 11, 2020.

(51) Int. Cl.
| H04B 7/185 | (2006.01) |
| H04L 1/08 | (2006.01) |
| H04L 5/00 | (2006.01) |

(52) U.S. Cl.
CPC ..... *H04B 7/18513* (2013.01); *H04B 7/18563* (2013.01); *H04L 1/08* (2013.01); *H04L 5/0016* (2013.01); *H04B 7/18532* (2013.01)

(58) Field of Classification Search
CPC ............ H04B 7/18513; H04B 7/18563; H04B 7/18532; H04L 1/08; H04L 5/0016
See application file for complete search history.

(56) References Cited

U.S. PATENT DOCUMENTS

| 9,609,651 B1 | 3/2017 | Sung et al. |
| 10,404,415 B2 | 9/2019 | Morioka et al. |

(Continued)

FOREIGN PATENT DOCUMENTS

| WO | 2019159548 | 8/2019 |
| WO | 2021258390 | 12/2021 |

(Continued)

OTHER PUBLICATIONS

Examination Report in corresponding/related Indian Application No. 202347032747 dated Mar. 18, 2024.

(Continued)

*Primary Examiner* — Afshawn M Towfighi
(74) *Attorney, Agent, or Firm* — PATENT PORTFOLIO BUILDERS PLLC

(57) ABSTRACT

In aspects, a non-terrestrial communication system communicates with a user equipment, UE, using repetitive communications. The non-terrestrial communication system determines a repetition configuration for repetitive communications with the UE and indicates the repetition configuration to the UE. The non-terrestrial communication system communicates with the UE using the repetitive communications in accordance with the repetition configuration.

20 Claims, 11 Drawing Sheets

(56) References Cited

U.S. PATENT DOCUMENTS

| | | |
|---|---|---|
| 2003/0054762 A1 | 3/2003 | Karabinis |
| 2005/0239403 A1 | 10/2005 | Karabinis |
| 2007/0025283 A1 | 2/2007 | Koslov |
| 2010/0009677 A1 | 1/2010 | Karabinis et al. |
| 2012/0122506 A1 | 5/2012 | Soliman |
| 2016/0381519 A1 | 12/2016 | Lauer et al. |
| 2017/0325248 A1 | 11/2017 | Mizusawa |
| 2017/0359838 A1 | 12/2017 | Xiao et al. |
| 2018/0069621 A1 | 3/2018 | Tong et al. |
| 2018/0279297 A1 | 9/2018 | Nogami et al. |
| 2019/0098607 A1 | 3/2019 | Zhang et al. |
| 2019/0239082 A1 | 8/2019 | Ravishankar |
| 2020/0022149 A1 | 1/2020 | Beale et al. |
| 2020/0068538 A1 | 2/2020 | Wang et al. |
| 2021/0036769 A1* | 2/2021 | Sorond ................ H04B 7/2615 |
| 2021/0127382 A1 | 4/2021 | Garcia et al. |
| 2022/0015148 A1* | 1/2022 | Sengupta .......... H04W 74/0833 |
| 2022/0052779 A1* | 2/2022 | Ye ........................ H04W 72/23 |

FOREIGN PATENT DOCUMENTS

| | | |
|---|---|---|
| WO | 2022103616 | 5/2022 |
| WO | 2022103701 | 5/2022 |

OTHER PUBLICATIONS

Examination Report in corresponding/related Indian Application No. 202347034881 dated Mar. 19, 2024.

"Discussion on HARQ enhancement", 3GPP TSG RAN WG1 #102, R1-2006031, Aug. 2020, 4 pages.
"Discussion on HARQ enhancement for NTN", 3GPP TSG RAN WG1 Meeting #102-e, R1-2005267, Aug. 2020, 5 pages.
"Discussion on HARQ enhancement for NTN", 3GPP TSG RAN WG1 Meeting #103-e—R1-2007571, Nov. 2020.
"Discussion on HARQ for NTN", 3GPP TSG RAN WG1 Meeting #98bis, R1-1910065, Oct. 2019, 4 pages.
"Discussion on PDCCH repetition for URLLC", 3GPP TSG RAN WG1 Meeting #92—R1-1801549, Mar. 2018, 6 pages.
"HARQ procedure in NTN", 3GPP TSG RAN WG1 Meeting #97, R1-1906954, May 2019.
"International Preliminary Report on Patentability", Application No. PCT/US2021/058463, Jan. 25, 2023, 13 pages.
"International Search Report and Written Opinion", Application No. PCT/US2021/058463, Feb. 16, 2022, 11 pages.
"International Search Report and Written Opinion", Application No. PCT/US2021/057594, Mar. 7, 2022, 11 pages.
"Solutions for NR to support non-terrestrial networks (NTN)", 3GPP TR 38.821 V16.0.0, Dec. 2019, 140 pages.
"Written Opinion", Application No. PCT/US2021/058463, Sep. 29, 2022, 5 pages.
Cassiau, et al., "Satellite and Terrestrial Multi-Connectivity for 5G: Making Spectrum Sharing Possible", Apr. 6, 2020, 6 pages.
Office Action in corresponding/related EP Application No. 21820371.9 dated Dec. 12, 2024.
Office Action in corresponding/related U.S. Appl. No. 18/252,460 dated Dec. 18, 2024.

* cited by examiner

REPETITIVE COMMUNICATIONS FOR IMPROVING RELIABILITY OF SATELLITE COMMUNICATIONS

RELATED APPLICATION(S)

This application is a national stage entry of International Application No. PCT/US2021/057594, filed Nov. 1, 2021, which claims the benefit of U.S. Provisional Application No. 63/112,378, filed Nov. 11, 2020, the disclosures of which are incorporated herein by reference in their entirety.

BACKGROUND

Non-terrestrial communication systems, such as satellite-based communication systems, provide flexibility to end-users. To illustrate, a single satellite that acts as a relay can provide coverage to remote locations that are difficult to reach, such as mountainous or oceanic areas with limited accessibility. However, non-terrestrial communications also pose challenges. For example, a user equipment (UE) may experience difficulties establishing and/or maintaining a wireless link with a satellite due to the orbital velocity of the satellite, which may adversely impact the services provided through the non-terrestrial communication system (e.g., poor signal quality, increased bit errors). As another example, the radio frequency (RF) bands allocated to non-terrestrial communications may have different power-density limitations enforced by a regulatory body (e.g., Federal Communications Commission (FCC), International Telecommunication Union (ITU)). In some scenarios, a selected power density (e.g., regulated) for an RF band may fail to support a particular operating scenario, such as when a UE operates at the edge of a cell. With recent advancements in wireless communication systems, new approaches may be available to improve a quality and/or reliability of services provided by non-terrestrial communication systems.

SUMMARY

This document describes techniques for repetitive communications for improving reliability of satellite communications. In aspects, a non-terrestrial communication system communicates with a user equipment (UE) using repetitive communications, where repetitive communications generally correspond to repeating transmission of a same communication (e.g., same source information, same modulation and coding scheme (MCS), same physical layer data, same control information, same reference signals) using multiple air interface resources. The non-terrestrial communication system determines a repetition configuration for repetitive communications with the UE and indicates the repetition configuration to the UE. The non-terrestrial communication system communicates with the UE using the repetitive communications in accordance with the repetition configuration.

In aspects, a UE communicates with a non-terrestrial communication system using repetitive communications. The UE receives, from the non-terrestrial communication system, a repetition configuration. In response to receiving the repetition configuration, the UE communicates with the non-terrestrial communication system using the repetitive communications in accordance with the repetition configuration.

The details of one or more implementations are set forth in the accompanying drawings and the following description. Other features and advantages will be apparent from the description, drawings, and examples described herein. This summary is provided to introduce subject matter that is further described in the Detailed Description and Drawings. Accordingly, this summary should not be considered to describe essential features nor used to limit the scope of the described subject matter.

BRIEF DESCRIPTION OF THE DRAWINGS

The details of one or more aspects of repetitive communications for improving reliability of satellite communications are described below. The use of the same reference numbers in different instances in the description and the figures may indicate like elements.

DETAILED DESCRIPTION

Figure 1:
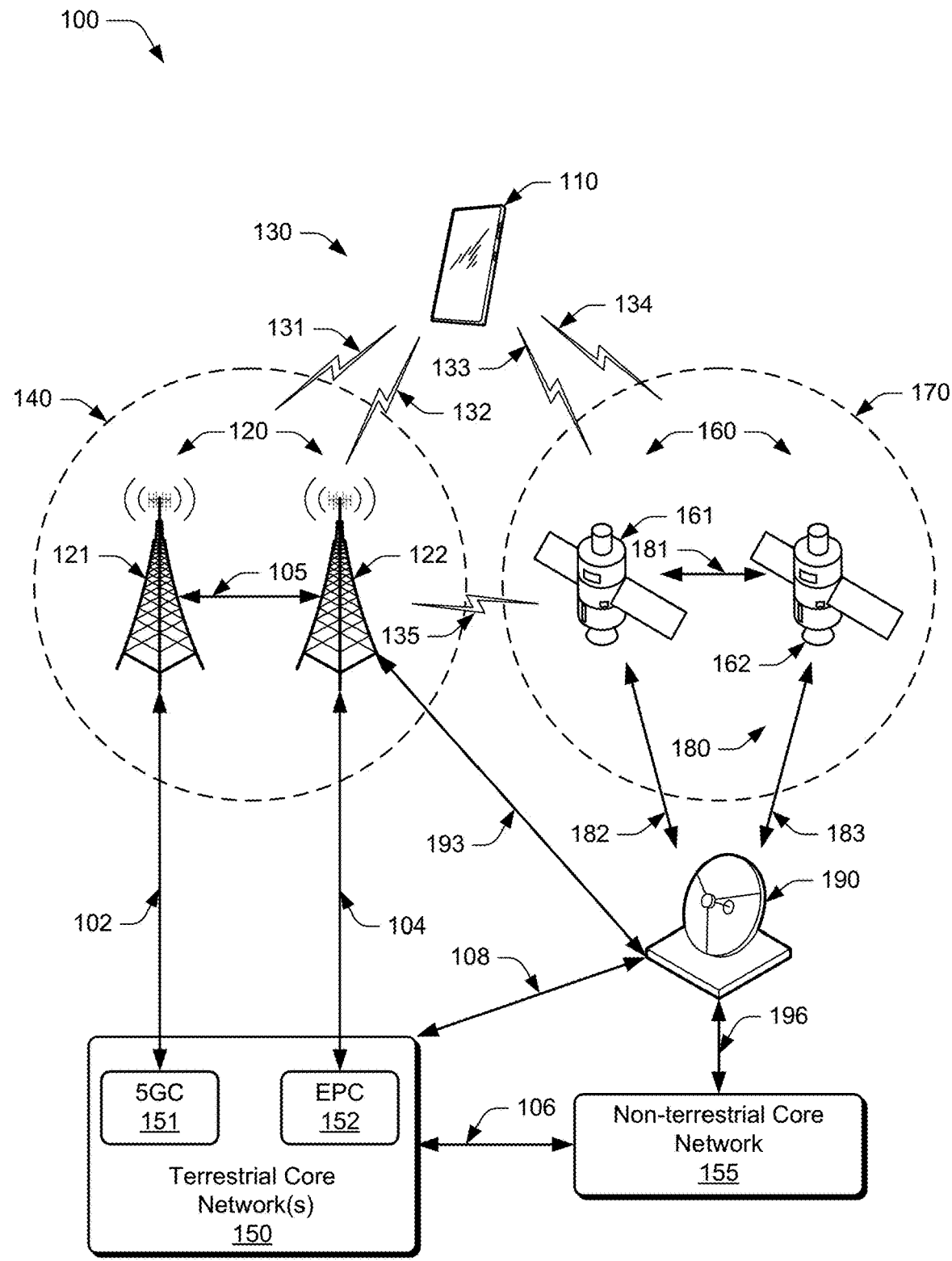
FIG. 1 illustrates an example environment that can be used in accordance with various aspects of repetitive communications for improving reliability of satellite communications.

User equipment (UE) communications with non-terrestrial communication systems (e.g., satellite communication systems) pose several challenges for UE mobility. For example, a UE may experience difficulties establishing and/or maintaining a wireless link with a satellite due to the orbital velocity of the satellite. These difficulties may adversely impact the services provided by the non-terrestrial communication system (e.g., poor signal-quality, increased bit errors). For instance, wireless signal transmissions to or from a fast-moving satellite may result in Doppler and/or time shifts at the receiver side that degrade a signal quality. As another example, a fast-moving satellite may only be within transmission/reception range over a small window of time (e.g., 10 to 20 minutes), where signal quality degrades at the edges of the transmission/reception range. In some aspects, regulatory bodies, such as the Federal Communications Commission (FCC) or the International Telecommunication Union (ITU), may limit the power densities of non-terrestrial transmissions in the corresponding radio frequency (RF) bands to mitigate interference issues. A regulated power density for an RF band can limit the effectiveness of a particular operating scenario, such as when a UE operates at the edge of a cell. As yet another challenge, UEs have constrained space for energy storage and hardware, which may impact how the UEs implement support for the non-terrestrial communications. For instance, the constrained space may not provide sufficient room for a parabolic and/or dish antenna. These various factors and challenges may result in poor signal quality for the non-terrestrial communications and culminate into unreliable communications (e.g., dropped calls, bit errors).

In aspects, a non-terrestrial communication system (e.g., any combination of a satellite, a ground station, a non-terrestrial core network) uses repetitive communications to improve a reliability of satellite communications between a UE and the non-terrestrial communication system. Generally, repetitive communications correspond to repeating transmission of a same communication using multiple air interface resources (e.g., multiple transmissions of a same communication using multiple air interface resources). To illustrate, the same communication can include any combination of the same source information, the same modulation and coding scheme (MCS), the same physical layer data, the same control information, the same reference signals, and so forth, that the non-terrestrial communication system and/or the UE repetitively transmits/receives as further described. To illustrate, the non-terrestrial communication system repetitively transmits the same source information using the same MCS over different bandwidth segments. Alternatively, the non-terrestrial communication system repetitively transmits the same source information using a (different) respective MCS for each respective transmission that uses a respective bandwidth segment.

In aspects, an entity of the non-terrestrial communication system, such as the ground station, the satellite, and/or the non-terrestrial core network, selects repetition configuration(s) that designate one or more repetition factors to use for the repetitive communications. To illustrate, and as described with reference to FIGS. 6-8, the repetition configurations designate any combination of: (i) a frequency-domain repetition factor that designates frequency bandwidth segments of a larger frequency bandwidth, (ii) a code-domain repetition factor that designates channel codes (e.g., low-density parity-check (LDPC) codes or polar codes), and/or (iii) a time-domain repetition factor that designates time partitions (e.g., time slots) for transmitting/receiving the satellite communications. This can include selecting a combination of different repetition configurations for downlink communications, uplink communications, control channel communications, data channel communications, synchronization signals, and so forth. Using the repetition configuration, a transmitter (e.g., a satellite for downlink transmissions, a UE for uplink transmissions) repeats transmissions to a receiver (e.g., the UE for downlink transmissions, the satellite for uplink transmissions), such as by repeating transmissions in each designated bandwidth segment, repeating transmissions using the different channel codes, and/or repeating transmissions in each time partition. While described as including a ground station and/or a satellite, other implementations of a non-terrestrial communication system can include alternative or additional devices, such as, by way of example and not of limitation, a balloon, an airplane and/or drone-based systems.

Repetitive communications (by way of repetitive transmissions) allow a UE and/or a satellite to demodulate and combine the respective transmissions to improve signal quality (e.g., improve a signal-to-noise ratio (SNR), mitigate fading effects) and, subsequently, reliability in recovering information and/or data in the communication. This also provides a mechanism that may be implemented by devices with constrained space and smaller form factors that limit hardware implementations. Further, some communication frameworks, such as orthogonal frequency division multiple access (OFDMA) frameworks, can improve reliability using repetitive communications without extensive hardware and/or software changes.

While features and concepts of the described systems and methods for repetitive communications for improving reliability of satellite communications can be implemented in any number of different environments, systems, devices, and/or various configurations, various aspects of repetitive communications for improving reliability of satellite communications are described in the context of the following example devices, systems, and configurations.

Operating Environment

FIG. 1 illustrates an example environment 100, which includes a user equipment 110 (UE 110) that can communicate with terrestrial base stations 120 (illustrated as terrestrial base stations 121 and 122) through one or more wireless communication links 130 (wireless links 130), generally illustrated as wireless link 131 and wireless link 132. Alternatively, or additionally, the UE 110 can communicate with one or more non-terrestrial communication platforms, illustrated as satellite(s) 160 (e.g., satellite 161 and satellite 162) through one or more of the wireless links 130, generally illustrated as wireless link 133 and wireless link 134. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The terrestrial base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, and the like, or any combination thereof.

The terrestrial base stations 120 communicate with the UE 110 using the wireless links 131 and/or 132, which may be implemented as any suitable type of wireless link. Similarly, the satellites 160 communicate with the UE 110 using the wireless links 133 and/or 134. At times, the terrestrial base stations 120 communicate with the satellites 160 using a wireless link 135. The wireless links 131, 132, 133, 134, and/or 135 include control-plane signaling and/or user-plane data, such as downlink of user-plane data and control-plane information communicated from the terrestrial base stations 120 to the UE 110, downlink of user-plane data and control-plane information from the satellites 160 to the UE 110, uplink of other user-plane data and control-plane information communicated from the UE 110 to the terrestrial base stations 120, uplink of other user-plane data and control-plane signaling communicated from the UE 110 to the satellites 160, downlink and uplink communications between a base station and a satellite, or any combination thereof. The wireless links 130 may include one or more wireless links (e.g., radio links) or bearers implemented using any suitable communication protocol or standard, or combination of communication protocols or standards, such as Third Generation Partnership Project Long-Term Evolution (3GPP LTE), Fifth Generation New Radio (5G NR), Mobile Satellite Service (MSS), and future evolutions. Multiple wireless links 130 may be aggregated in a carrier aggregation or multi-connectivity technology to provide a higher data rate for the UE 110. Multiple wireless links 130 from multiple terrestrial base stations 120 may be configured for Coordinated Multipoint (CoMP) or Dual Connectivity (DC) communication with the UE 110. In some aspects, the UE 110 uses multi-connectivity technology to establish contemporaneous wireless links with the satellite 161 and the satellite 162.

The terrestrial base stations 120 form a first wireless communication network, such as a Radio Access Network 140 (e.g., RAN, Evolved Universal Terrestrial Radio Access Network, E-UTRAN, 5G NR RAN, NR RAN), where the RAN 140 communicates with one or more terrestrial core networks 150 (core network 150). To illustrate, the terrestrial base station 121 connects, at interface 102, to a 5G core network 151 (5GC 151) through an NG2 interface for control-plane signaling and using an NG3 interface for user-plane data communications. The terrestrial base station 122 connects, at interface 104, to an Evolved Packet Core 152 (EPC 152) using an S1 interface for control-plane signaling and user-plane data communications. Alternatively, or additionally, the terrestrial base station 122 connects to the 5GC 151 using an NG2 interface for control-plane signaling and through an NG3 interface for user-plane data communications (not illustrated). Accordingly, certain terrestrial base stations 120 can communicate with multiple wireless core networks 150 (e.g., 151, the EPC 152).

In addition to connections with core networks, the terrestrial base stations 120 may communicate with each other. For example, the terrestrial base stations 121 and 122 communicate through an Xn interface at interface 105. In some aspects, a terrestrial base station 120 coordinates with a satellite 160 through the wireless link 135 and/or through the connection to the terrestrial core network 150. As another example, a terrestrial core network 150 coordinates with a non-terrestrial core network 155 through an interface 106 as further described.

The satellites 160 form a second wireless communication network, generally labeled in the environment 100 as a satellite access network 170 (SAN 170). The SAN 170 can alternatively or additionally be referred to as a satellite communication system. In aspects, the UE 110 communicates with the satellites using the wireless links 133 and/or 134 that can be implemented using a common radio-access technology (RAT) used to communicate with the terrestrial base stations 120 and/or a satellite RAT different from RATs used to communicate with the terrestrial base stations 120. As one example, the RAT used to communicate with the satellites 160 may operate in accordance with frequencies and protocols that might be associated with a Mobile Satellite Service (MSS) or the like. Alternatively or additionally, the UE 110 communicates with the satellites 160 using one or more RATs used to communicate with the terrestrial base stations 120, such as LTE, 5G NR, 6G communications, and so forth.

Generally, the satellite 161 and satellite 162 represent non-terrestrial communication platforms and may be, for example, a low earth orbit (LEO) satellite, a medium earth orbit (MEO) satellite, or a geostationary earth orbit (GEO) satellite. The satellite 161 and the satellite 162 can include on-board processing to implement base station functionality (e.g., a gNode B, a Distributed Unit (DU)) and/or implement a bent-pipe architecture in which the satellite acts as a transponder relay. The satellite 161 and the satellite 162 communicate with elements of the SAN 170 by way of one or more interfaces 180 (illustrated as interface 181, interface 182, and interface 183). Interface 181 supports an inter-satellite link (ISL) connecting satellite 161 and satellite 162 and may be, for example, an optical interface, a laser interface, or a radio-frequency (RF) interface. Interfaces 182 and 183 support gateway links (GWLs) connecting satellite 161 and satellite 162, respectively, to a non-terrestrial core network 155, such as through one or more satellite ground stations 190 (e.g., remote radio units (RRUs)) and interface 196. The non-terrestrial core network 155 can include and/or communicate with any combination of ground stations (e.g., satellite ground stations 190), servers, routers, switches, control elements, and the like. The ground station 190 can alternatively or additionally be referred to as a non-terrestrial base station. As shown, the non-terrestrial core network 155 communicates with the terrestrial core network 150 through an interface 106 and the ground station 190 through the interface 196 (e.g., N1, N2, and/or N3 interface). In different configurations, however, a satellite ground station 190 may connect to a terrestrial core network through interface 108 (e.g., N1, N2, and/or N3 interface) or to a base station 120 through a different interface 193 (illustrated generally in FIG. 1 as an interface to the base station 122).

Example Devices

Figure 2:
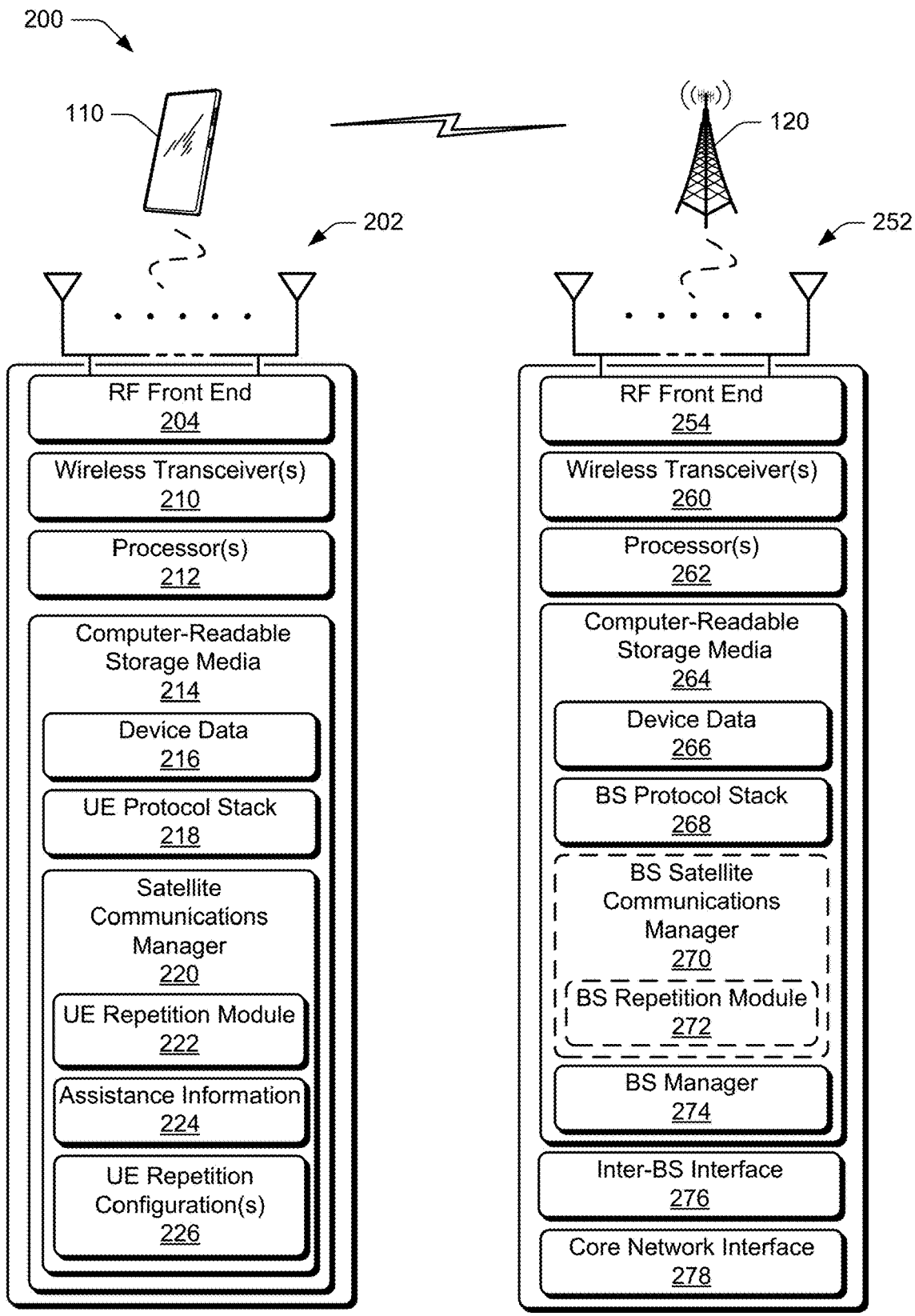
FIG. 2 illustrates an example device diagram of entities that can implement various aspects of repetitive communications for improving reliability of satellite communications.

FIG. 2 illustrates an example device diagram 200 of the UE 110 and one of the base stations 120 that can implement various aspects of repetitive communications for improving reliability of satellite communications. The UE 110 and/or the base station 120 may include additional functions and interfaces that are omitted from FIG. 2 for the sake of clarity.

The UE 110 includes antennas 202, a radio frequency front end 204 (RF front end 204), and one or more wireless transceiver 210 (e.g., an LTE transceiver, a 5G NR transceiver, and/or a 6G transceiver) for communicating with the base station 120 in the RAN 140 and/or the satellite 160 in the SAN 170. The RF front end 204 of the UE 110 can couple or connect the wireless transceiver 210 to the antennas 202 to facilitate various types of wireless communication. The antennas 202 of the UE 110 may include an array of multiple antennas that are configured in a manner similar to or different from each other. The antennas 202 and the RF front end 204 can be tuned to, and/or be tunable to, one or more frequency bands defined by the 3GPP LTE communication standards, 5G NR communication standards, 6G communication standards, and/or various satellite frequency bands, such as the L-band (1-2 Gigahertz (GHz)), the S-band (2-4 GHz), the C-band (4-8 GHz), the X-band (8-12 GHz), the Ku-band (12-18 GHz), K-band (18-27 GHz), and/or the Ka-band (27-40 GHz), and implemented by the wireless transceiver 210. In some aspects, the satellite frequency bands overlap with the 3GPP LTE-defined, 5G NR-defined, and/or 6G-defined frequency bands. Additionally, the antennas 202, the RF front end 204, and/or the wireless transceiver 210 may be configured to support beamforming for the transmission and reception of communications with the base station 120 and/or the satellite 160. By way of example and not limitation, the antennas 202 and the RF front end 204 can be implemented for operation in sub-gigahertz (GHz) bands, sub-6 GHz bands, and/or above 6 GHz bands that are defined by the 3GPP LTE, 5G NR, 6G, and/or satellite communications (e.g., satellite frequency bands).

The UE 110 also includes one or more processor(s) 212 and computer-readable storage media 214 (CRM 214). The processor(s) 212 may be single-core processor(s) or multiple-core processor(s) composed of a variety of materials, for example, silicon, poly silicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the UE 110. The device data 216 can include user data, sensor data, control data, automation data, multimedia data, beamforming codebooks, applications, and/or an operating system of the UE 110, some of which are executable by the processor(s) 212 to enable user-plane data, control-plane information, and user interaction with the UE 110.

The CRM 214 of the UE 110 includes the UE protocol stack 218. The UE protocol stack 218 may be implemented in whole or part as hardware logic or circuitry integrated with or separate from other components of the UE 110. The UE protocol stack 218 may implement any suitable type of communication protocol, such as in a manner similar to the example wireless network stack model 400 described with reference to FIG. 400. In some aspects, the UE protocol stack 218 implements one or more features of repetitive communications for improving reliability of satellite communications.

The CRM 214 of the UE 110 includes a satellite communications manager 220. The satellite communications manager 220 may be implemented in whole or part as hardware logic or circuitry integrated with or separate from other components of the UE 110. While shown separate in the diagram 200, some implementations include portions or all functionality provided by the UE satellite communications manager 220 within the UE protocol stack 218. In some aspects, the satellite communications manager 220 includes a user equipment repetition module 222 (UE repetition module 222), assistance information 224, and/or one or more user equipment repetition configurations 226 (UE repetition configurations 226) used for repetitive communications with a satellite (e.g., the satellite 160). While shown as being included in the satellite communications manager 220, the UE repetition module 222, the assistance information 224, and/or the UE repetition configurations 226 may be implemented and/or stored external to the satellite communications manager 220. As one example, the assistance information 224 and/or the UE repetition configurations 226 may be stored as part of the device data 216.

The UE repetition module 222 determines and/or generates the assistance information 224 that indicates a UE location (e.g., of the UE 110), respective locations of the satellite 160 or other satellites, mobility characteristics of the UE (e.g., velocity or direction), signal-to-noise ratios (SNRs) of respective satellite communication links, a request to enable or disable repetitive communications, or the like. Alternatively or additionally, the UE repetition module 222 obtains and/or uses any combination of location information (e.g., UE location, satellite location), UE-mobility characteristics, SNRs, UE-state information (e.g., battery level state, radio resource control (RRC) state information) to determine and/or select UE-selected repetition factors (e.g., frequency-domain repetition factors, time-domain repetition factors, code-domain repetition factors) included in the assistance information 224. The UE repetition module 222 may forward the assistance information 224 (e.g., with or without UE-selected repetition factors) to the non-terrestrial communication system.

In some aspects, the UE repetition module 222 generates the UE-selected repetition factors in response to one or more trigger events. For instance, in response to identifying that a battery power level has fallen below a battery-power-level threshold value (or receiving an indication of the low battery power level from another module included in the UE 110), the UE repetition module 222 determines a UE-selected repetition factor with fewer repetitive communications relative to those used in a current UE repetition configuration to reduce computations and conserve energy. As another example, the UE repetition module 222 identifies that the UE 110 has changed (or is scheduled to change) to a different RRC state (e.g., has changed from an RRC_CONNECTED state to an RRC_IDLE state or an RRC_INACTIVE state, has changed from the RRC_IDLE/RRC_INACTIVE state to the RRC_CONNECTED state) and generates the UE-selected repetition factors based on the changing RRC state, such as by requesting fewer repetitive communications when operating in the RRC_IDLE and/or RRC_INACTIVE state relative to the RRC_CONNECTED state to conserve energy. Alternatively or additionally, the UE repetition module 222 may determine and generate UE-selected repetition factors based on RRC states without identifying a pending RRC-state change.

In some aspects, the UE repetition module 222 receives the UE repetition configuration(s) 226 indirectly or directly from the ground station 190, the satellite 160, and/or the non-terrestrial core network 155, where the UE repetition configuration(s) 226 may or may not be based on UE-selected repetition factors selected and communicated by the UE 110. As one example, the UE 110 receives the UE repetition configurations 226 (by way of the antenna 202, the RF front end 204, the wireless transceivers 210, and/or the UE protocol stack 218) from the satellite 190 through broadcast, multicast, and/or unicast messages, such as a broadcast message that indicates one or more repetition configurations and/or an indication of whether repetitive communications are enabled/disabled.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), Radio Unit (RU), and/or Remote Radio Unit (RRU). The base station 120 includes antennas 252, a radio frequency front end 254 (RF front end 254), one or more wireless transceivers 260 (e.g., one or more LTE transceivers, one or more 5G NR transceivers, and/or one or more 6G transceivers) for communicating with the UE 110 and/or the satellite 160. The RF front end 254 of the base station 120 can couple or connect the wireless transceivers 260 to the antennas 252 to facilitate various types of wireless communication. The antennas 252 of the base station 120 may include an array of multiple antennas that are configured in a manner similar to, or different from, each other. The antennas 252 and the RF front end 254 can be tuned to, and/or be tunable to, one or more frequency bands defined by the 3GPP LTE, 5G NR, 6G communication standards, and/or various satellite frequency bands, and implemented by the wireless transceivers 260. Additionally, the antennas 252, the RF front end 254, and the wireless transceivers 260 may be configured to support beamforming (e.g., Massive multiple-input, multiple-output (Massive-MIMO)) for the transmission and reception of communications with the UE 110 and/or the satellite 160.

The base station 120 also includes processor(s) 262 and computer-readable storage media 264 (CRM 264). The processor 262 may be a single-core processor or a multiple-core processor composed of a variety of materials, for example, silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base station 120. The device data 266 can include network scheduling data, radio resource management data, beamforming codebooks, applications, and/or an operating system of the base station 120, which are executable by processor(s) 262 to enable communication with the UE 110, the satellite 160, and/or the ground station 190.

The CRM 264 includes a base station protocol stack 268 (BS protocol stack 268). The BS protocol stack 268 may be implemented in whole or part as hardware logic or circuitry integrated with or separate from other components of the base station 120. The BS protocol stack 268 may implement any suitable type of communication protocol, such as in a manner similar to the example wireless network stack model 400 described with reference to FIG. 4.

Figure 6:
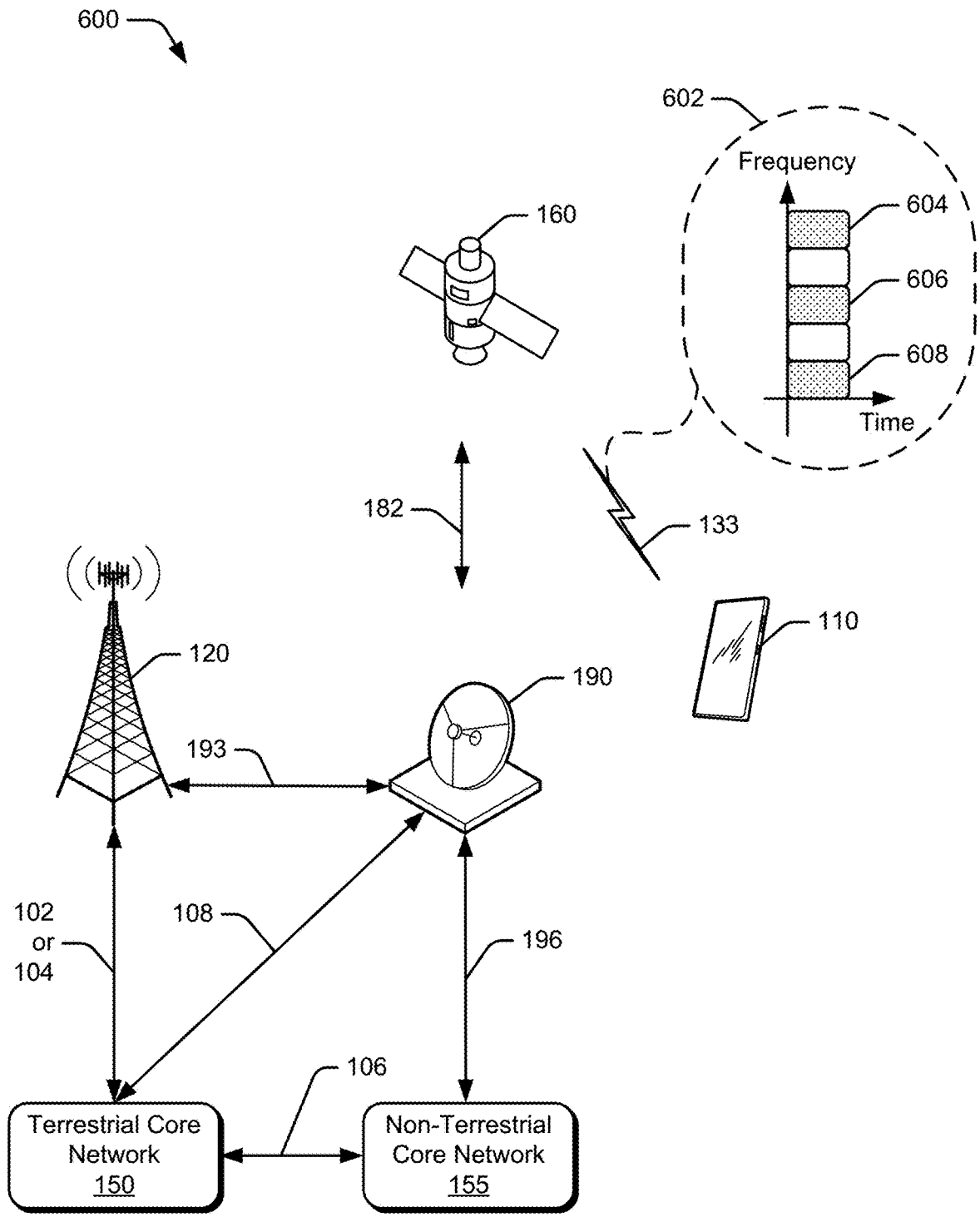
FIG. 6 illustrates an example environment that can be used in accordance with various aspects of repetitive communications for improving reliability of satellite communications.

The CRM 264 optionally includes a base station satellite communications manager 270 (BS satellite communications manager 270). The BS satellite communications manager 270 may be implemented in whole or part as hardware logic or circuitry integrated with or separate from other components of the base station 120. While shown as separate in the diagram 200, some implementations include portions or all functionality provided by the BS satellite communications manager 270 within the BS protocol stack 268. In some aspects, the BS satellite communications manager 270 manages communications and/or coordination with non-terrestrial communication systems. To illustrate, the BS satellite communications manager 270 optionally includes a base station repetition module 272 (BS repetition module 272) that may implement aspects of repetitive communication, as described with reference to FIGS. 6-11. As one example, the BS repetition module may communicate with the non-terrestrial core network 155, the ground station 190, and/or the satellite 190 using various interfaces as shown in FIGS. 1 and 6 to determine repetition configurations (e.g., UE repetition configuration(s) 226, satellite repetition configuration 326).

The CRM 264 of the base station 120 also includes a base station manager 274 (BS manager 274), which may control various functionalities of the base station 120. Alternatively or additionally, the BS manager 274 may be implemented in whole or in part as hardware logic or circuitry integrated with, or separate from, other components of the base station 120. In at least some aspects, the BS manager 274 configures the wireless transceivers 260 for communication with the UE 110, the satellite 160, and/or core network(s) (e.g., the terrestrial core network 150, the non-terrestrial core network 155). The base station 120 also includes an inter-base station interface 276, such as an Xn and/or X2 interface, which the base station manager configures to exchange user-plane data, control-plane information, and/or other data/information between other base stations, to manage the communication of the base station 120 with the UE 110 and/or the satellite 160. The base station 120 includes a core network interface 278 that the base station manager 274 configures to exchange user-plane data, control-plane information, and/or other data/information with core network functions and/or entities.

Figure 3:
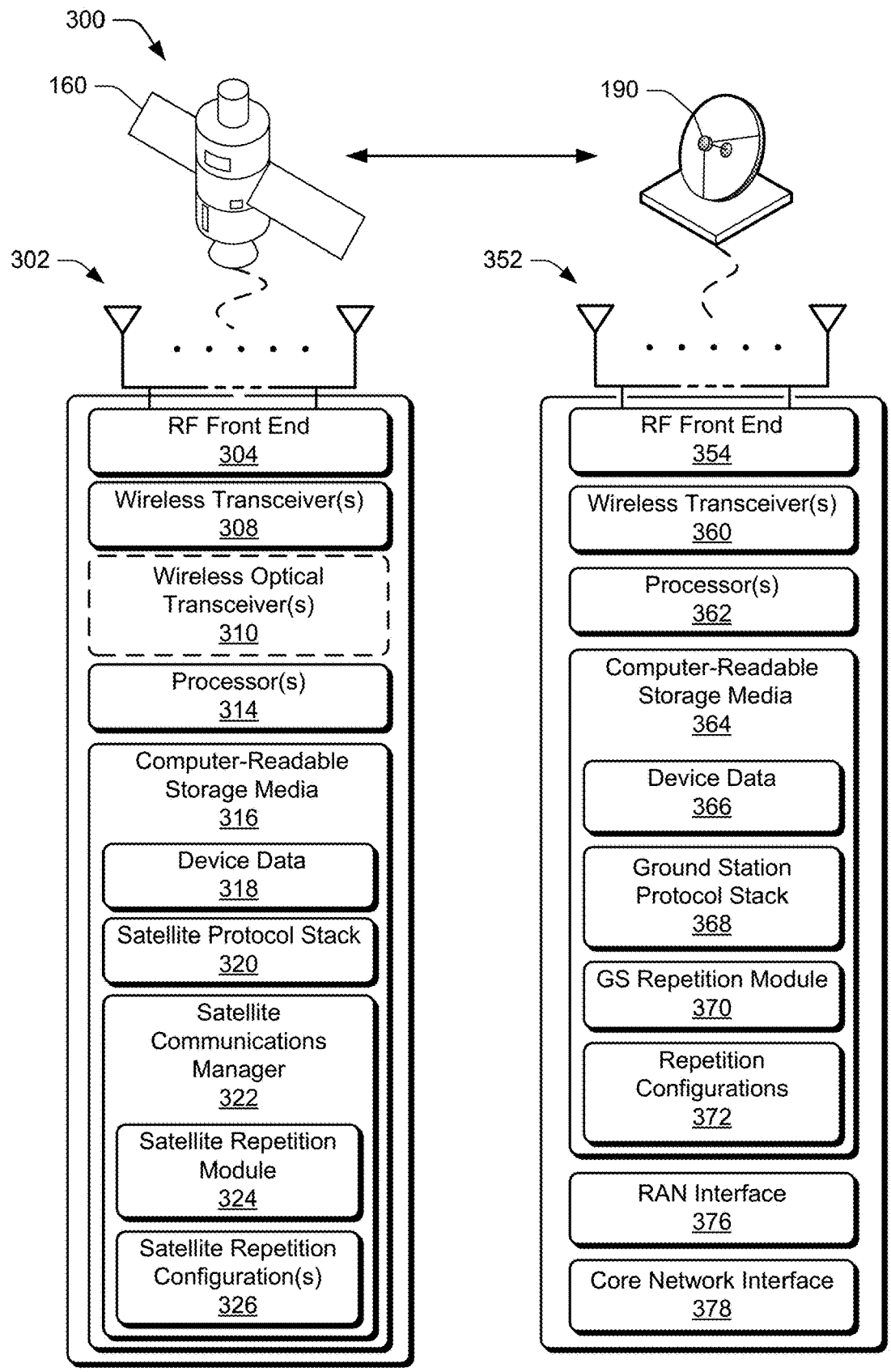
FIG. 3 illustrates an example device diagram of entities that can be used in accordance with one or more aspects of repetitive communications for improving reliability of satellite communications.

FIG. 3 illustrates an example device diagram 300 of the satellite 160 and the ground station 190 (alternately a non-terrestrial base station) that can implement various aspects of repetitive communications for improving reliability of satellite communications. The satellite 160 and the ground station 190 may include additional functions and interfaces that are omitted from FIG. 3 for the sake of visual clarity.

The satellite 160 can include on-board processing to implement a single network node (e.g., a gNode B). Alternatively or additionally, the satellite 160 implements distributed base station functionality, such as a Distributed Unit (DU), that communicates with a Central Unit (CU) at the ground station 190. In some aspects, the satellite 160 implements a bent-pipe architecture in which the satellite acts as a transponder relay to relay messages between the UE 110 and the ground station 190. The satellite 160 includes one or more antenna(s) 302, a radio frequency front end 304 (RF front end 304), and one or more wireless transceivers 306 for wirelessly communicating with the base station 120, the UE 110, another satellite 160, and/or the ground station 190.

The antenna(s) 302 of the satellite 160 may include an array of multiple antennas that are configured in a manner similar to or different from each other. Additionally, the antennas 302, the RF front end 304, and the transceiver(s) 306 may be configured to support beamforming for the transmission and reception of communications with the base stations 120, the UE 110, another satellite 160, and/or the non-terrestrial core network 155. By way of example and not limitation, the antennas 302 and the RF front end 304 can be implemented for operation in sub-gigahertz bands, sub-6 GHz bands, and/or above 6 GHz bands. To illustrate, the antennas 302 and the RF front end 304 can be implemented for operation in any combination of satellite frequency bands (e.g., L-band, S-band, C-band, X-band, Ku-band, K-band, Ka-band). Alternatively or additionally, the antennas 302 and the RF front end 304 can be implemented for operation in any combination frequency bands used to communicate with terrestrial base stations. Thus, the antenna 302, the RF front end 304, and the transceiver(s) 306 provide the satellite 160 with an ability to receive and/or transmit communications with the base station 120, the UE 110, another satellite 160, and/or the non-terrestrial core network 155.

The satellite 160 optionally includes one or more wireless optical transceiver 310 (wireless optical transceiver(s) 310) that can be used to communicate with other devices. To illustrate, a first instance of the satellite 160 communicates with a second instance of the satellite 160 using the wireless optical transceiver 310 as part of the interface 181.

The satellite 160 includes one or more processor(s) 314 and computer-readable storage media 316 (CRM 316). The processor(s) 314 may be single-core processor(s) or multiple-core processor(s) implemented with a homogenous or heterogeneous core-structure. The computer-readable storage media described herein excludes propagating signals. CRM 316 may include any suitable memory or storage device such as RAM, SRAM, DRAM, NVRAM, ROM, or Flash memory useable to store device data 318 of the satellite 160. The device data 318 includes user data, multimedia data, applications, and/or an operating system of the satellite 160, which are executable by the processor(s) 314 to enable various aspects of repetitive communications for improving reliability of satellite communications as further described.

In aspects of repetitive communications for improving reliability of satellite communications, the CRM 316 of the satellite 160 includes a satellite protocol stack 320. The satellite protocol stack 320 may be implemented in whole or part as hardware logic or circuitry integrated with or separate from other components of the satellite 160. The satellite protocol stack 320 may implement any suitable type of communication protocol, such as in a manner similar to the example wireless network stack model 400 described with reference to FIG. 4.

The CRM 316 includes a satellite communications manager 322. The satellite communications manager 322 may be implemented in whole or part as hardware logic or circuitry integrated with or separate from other components of the satellite 160. While shown as separate in the diagram 300, some implementations include portions or all functionality provided by the satellite communications manager 322 within the satellite protocol stack 320. The satellite communications manager 322 includes a satellite repetition module 324 and one or more satellite repetition configurations 326. While shown as being included in the satellite communications manager 322, the satellite repetition module 324 and/or the satellite repetition configuration(s) 326 may be implemented and/or stored external to the satellite communications manager 322. As one example, the satellite repetition configurations 326 may be stored as part of the device data 318.

In aspects, the satellite repetition module 324 manages the repetitive communications performed by the satellite 160. As one example, the satellite repetition module 324 initiates multiple repetitive transmissions of a downlink communication to the UE 110 and/or recovers multiple repetitive transmissions of an uplink communication from the UE 110 in accordance with one or more satellite repetition configurations 326. In aspects, the satellite repetition configurations 326 specify complementary repetition configurations and/or repetition factors (e.g., frequency-domain repetition factors, time-domain repetition factors, code-domain repetition factors) to those designated by the UE repetition configurations 226 to synchronize the repetitive communications between the UE 110 and the satellite 160. In some aspects, such as in a bent-pipe architecture in which the satellite 160 acts as a transponder relay, the satellite repetition module 324 receives the satellite repetition configurations 326 from the ground station 190 and/or the non-terrestrial core network 155. As another example, when the satellite 160 includes ground station functionalities (e.g., gNB-DU functions or a satellite with a collocated base station), the satellite repetition module 324 determines the satellite repetition configuration(s) 326 and/or the UE repetition configuration(s) 226. This can include determining the satellite repetition configuration(s) 326 and/or the UE repetition configuration(s) 226 with or without assistance information from the UE 110 (e.g., the assistance information 224). To illustrate, the satellite repetition module 324 may select a first repetition configuration pair (e.g., a satellite repetition configuration and complementary UE repetition configuration) for broadcast messages without using the assistance information 224 and a second repetition configuration pair for unicast messages to the UE 110 using the assistance information 224. In aspects, the satellite repetition module 324 selects the repetition configurations by using default repetition configurations and/or by accessing historical records of repetition configurations based on ephemeris data (e.g., timing information, current location, predicted location, trajectory information) associated with the satellite 160. Alternatively or additionally, satellite repetition module 324 includes an indication of whether repetitive communications are enabled/disabled in messages that communicate the repetition configurations.

The device diagram for the ground station 190, shown in FIG. 3, can implement a single network node (e.g., a gNode B). At times, the functionality of the ground station 190 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), Radio Unit (RU), and/or Remote Radio Unit (RRU). The ground station 190 includes antennas 352, a radio frequency front end 354 (RF front end 354), one or more wireless transceivers 360 (e.g., one or more LTE transceivers, one or more 5G NR transceivers, and/or one or more 6G transceivers) for communicating with the satellite 160. The RF front end 354 of the ground station 190 can couple or connect the wireless transceivers 360 to the antennas 352 to facilitate various types of wireless communication. The antennas 352 of the ground station 190 may include an array of multiple antennas that are configured in a manner similar to, or different from, each other. The antennas 352 and the RF front end 354 can be tuned to, and/or be tunable to, one or more satellite frequency bands and/or frequency bands defined by the 3GPP LTE communication standards, 5G NR communication standards, 6G communication standards, and/or various satellite frequency bands, and implemented by the wireless transceivers 360. Additionally, the antennas 352, the RF front end 354, and/or the wireless transceivers 360 may be configured to support beamforming (e.g., Massive multiple-input, multiple-output (Massive-MIMO)) for the transmission and reception of communications with the satellite 160.

The ground station 190 also includes one or more processor(s) 362 and computer-readable storage media 364 (CRM 364). The processor(s) 362 may be single-core processor(s) or multiple-core processor(s) composed of a variety of materials, for example, silicon, polysilicon, high-K dielectric, copper, and so on. CRM 364 may include any suitable memory or storage device such as random-access memory (RAM), static RAM (SRAM), dynamic RAM (DRAM), non-volatile RAM (NVRAM), read-only memory (ROM), or Flash memory useable to store device data 366 of the ground station 190. The device data 366 may include network scheduling data, radio resource management data, beamforming codebooks, applications, and/or an operating system of the ground station 190, which are executable by the processor(s) 362 to enable communication with the satellite 160.

The CRM 364 includes a ground station protocol stack 368. The ground station protocol stack 368 may be implemented in whole or part as hardware logic or circuitry integrated with or separate from other components of the ground station 190. The ground station protocol stack 368 may implement any suitable type of communication protocol, such as in a manner similar to the example wireless network stack model 400 described with reference to FIG. 4.

The CRM 364 includes a ground station repetition module 370 (GS repetition module 370). The GS repetition module 370 may be implemented in whole or part as hardware logic or circuitry integrated with or separate from other components of the ground station 190. While shown separate in the diagram 300, some implementations include portions or all functionality provided by the ground station repetition module 370 within the ground station protocol stack 368.

In aspects, the GS repetition module 370 manages the repetitive communications between the satellite 160 and the UE 110. As one example, the GS repetition module 370 receives the assistance information 224 from the UE 110, by way of the satellite 160, and determines the UE repetition configurations 226 and/or the satellite repetition configurations 326, generally shown as the repetition configurations 372 stored in the CRM 364, using the assistance information. To illustrate, the GS repetition module 370 obtains UE-selected repetition factors from the assistance information and determines the repetition configurations 372 in accordance with the UE-selected repetition factors in similar manners as described with reference to the satellite repetition module 324. Alternatively, or additionally, the GS repetition module 370 determines the repetition configurations 372 without receiving assistance information from the UE 110, such as by using default repetition configurations and/or by accessing historical records of repetition configurations based on ephemeris data associated with the satellite 160.

The ground station 190 may include a radio access network interface 376 (RAN interface 376) to implement the interface 193 to the base stations 120. In aspects, the RAN interface 376 is analogous to an Xn or X2 interface between terrestrial base stations. The ground station may also include a core network interface 378 to implement the interface 196 and/or the interface 108 that enables the ground station to communicate with the core network of the non-terrestrial network of the satellite communication network or communicate with a terrestrial core network.

Example Protocol Stack

Figure 4:
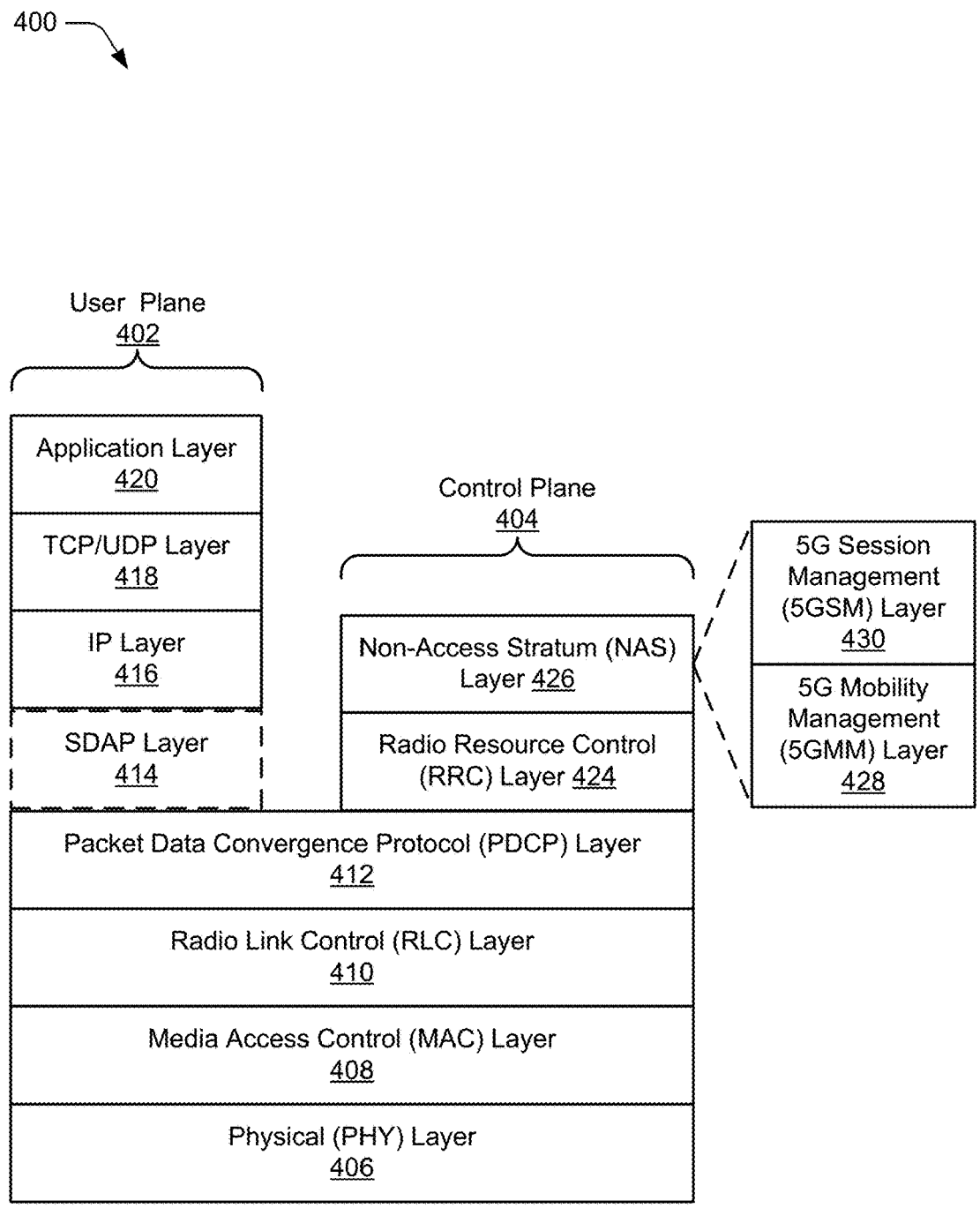
FIG. 4 illustrates an example wireless network protocol stack that can be used in accordance with one or more aspects of repetitive communications for improving reliability of satellite communications.

FIG. 4 illustrates an example block diagram of a wireless network stack model 400 (stack 400, network stack 400) that can be used in accordance with various aspects of repetitive communications for improving reliability of satellite communications. The network stack 400 characterizes an example protocol stack used in terrestrial and/or non-terrestrial communication systems, as shown in the example environment 100. The network stack 400 includes a user plane 402 and a control plane 404. Upper layers of the user plane 402 and the control plane 404 share common lower layers in the network stack 400. Wireless devices, such as the UE 110, the base station 120, the satellite 160, and/or the ground station 190, implement each layer as an entity for communication with another device using the protocols defined for the layer. For example, the UE 110 uses a Packet Data Convergence Protocol (PDCP) entity to communicate to a peer PDCP entity in the base station 120 and/or the satellite 160 using the PDCP.

The shared lower layers include a physical (PHY) layer 406, a Media Access Control (MAC) layer 408, a Radio Link Control (RLC) layer 410, and a PDCP layer 412. The PHY layer 406 provides hardware specifications for devices that communicate with each other. As such, the PHY layer 406 establishes how devices connect to each other, assists in managing how communication resources are shared among devices, and the like.

The MAC layer 408 specifies how data is transferred between devices. Generally, the MAC layer 408 provides a way in which data packets being transmitted are encoded and decoded into bits as part of a transmission protocol.

The RLC layer 410 provides data transfer services to higher layers in the network stack 400. Generally, the RLC layer 410 provides error correction, packet segmentation and reassembly, and management of data transfers in various modes, such as acknowledged, unacknowledged, or transparent modes.

The PDCP layer 412 provides data transfer services to higher layers in the network stack 400. Generally, the PDCP layer 412 provides the transfer of user plane 402 and control plane 404 data, header compression, ciphering, and integrity protection.

Above the PDCP layer 412, the stack splits into the user plane 402 and the control plane 404. Layers of the user plane 402 include an optional Service Data Adaptation Protocol (SDAP) layer 414, an Internet Protocol (IP) layer 416, a Transmission Control Protocol/User Datagram Protocol (TCP/UDP) layer 418, and an application layer 420, which transfers data using various interfaces. The optional SDAP layer 414 is present in 5G NR networks. The SDAP layer 414 maps a Quality of Service (QoS) flow for each data radio bearer and marks QoS flow identifiers in uplink and downlink data packets for each packet data session. The IP layer 416 specifies how the data from the application layer 420 is transferred to a destination node. The TCP/UDP layer 418 is used to verify that data packets intended to be transferred to the destination node reached the destination node, using either TCP or UDP for data transfers by the application layer 420. In some implementations, the user plane 402 may also include a data services layer (not shown) that provides data transport services to transport application data, such as IP packets including web-browsing content, video content, image content, audio content, or social media content.

The control plane 404 includes a Radio Resource Control (RRC) layer 424 and a Non-Access Stratum (NAS) layer 426. The RRC layer 424 establishes and releases connections and radio bearers, broadcasts system information, or performs power control. The RRC layer 424 also controls a resource-control state of the UE 110 and causes the UE 110 to perform operations according to the resource-control state. Example resource-control states include a connected state (e.g., an RRC_CONNECTED state) or a disconnected state, such as an inactive state (e.g., an RRC_INACTIVE state) or an idle state (e.g., an RRC_IDLE state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 424 supports 3GPP access but does not support non-3GPP access (e.g., WLAN communications).

The NAS layer 426 provides support for mobility management (e.g., using a Fifth-Generation Mobility Management (5GMM) layer 428) and packet data bearer contexts (e.g., using a Fifth-Generation Session Management (5GSM) layer 430) between the UE 110 and entities or functions in the core network, such as an Access and Mobility Management Function of the 5GC 151 or the like. The NAS layer 426 supports both 3GPP access and non-3GPP access.

In the UE 110, each layer in both the user plane 402 and the control plane 404 of the network stack 400 interacts with a corresponding peer layer or entity in the base station 120, the satellite 160, a terrestrial core network entity or function, a non-terrestrial core network entity or function, a ground station, and/or a remote service, to support user applications and control operation of the UE 110 in the RAN 140.

Example Air Interface Resources

Figure 5:
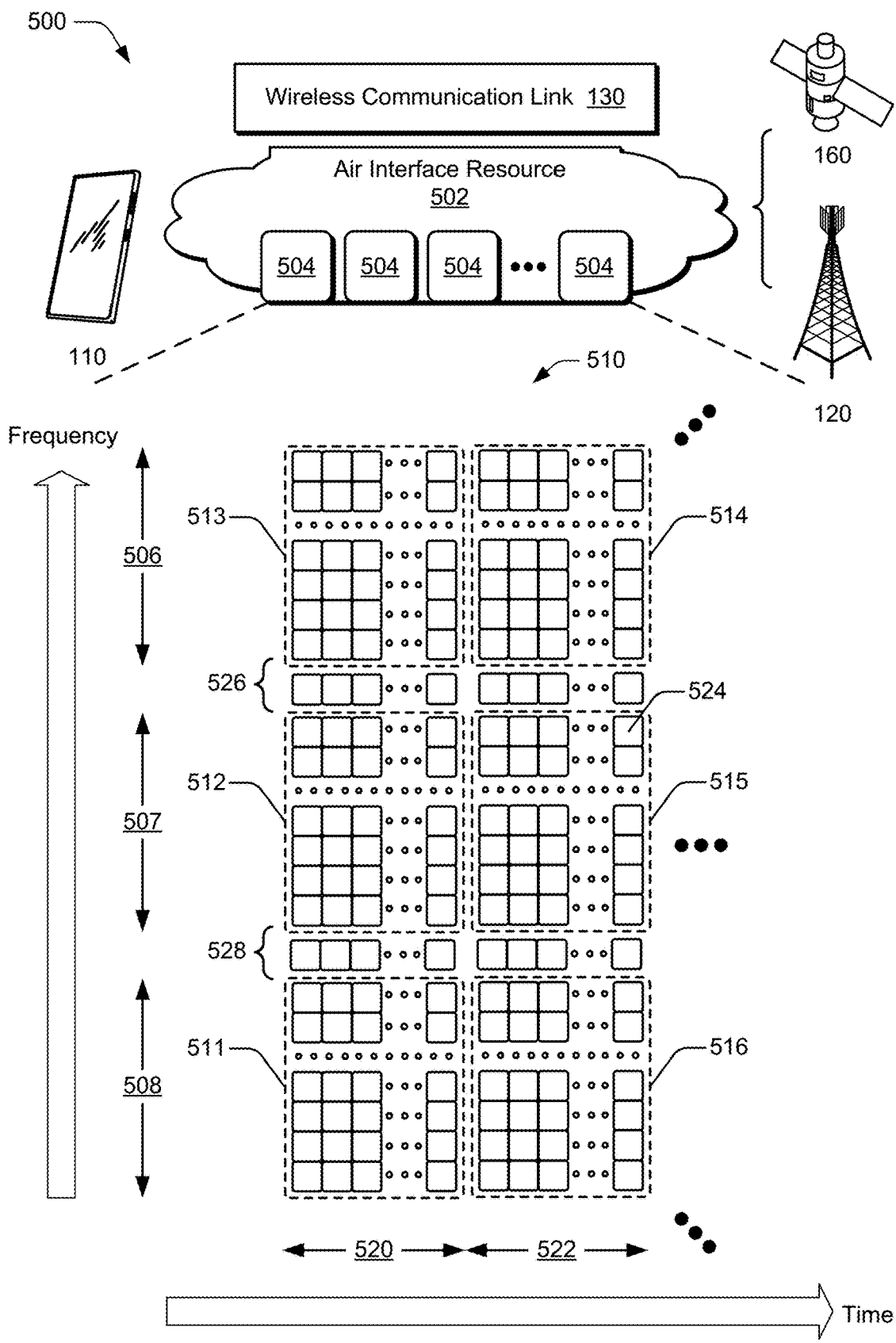
FIG. 5 illustrates example air interface resources that can be used in accordance with various aspects of repetitive communications for improving reliability of satellite communications.

FIG. 5 illustrates an example 500 that includes an example air interface resource 502 that extends between the UE 110 and the base station 120 and/or the satellite 160 that can be used to implement various aspects of repetitive communications for improving reliability of satellite communications. The air interface resource 502 can be divided into resource units 504, each of which occupies some intersection of frequency spectrum and elapsed time. A portion of the air interface resource 502 is illustrated graphically in a grid or matrix having multiple resource blocks 510, including example resource blocks 511, 512, 513, 514, 515, and 516. An example of a resource unit 504, therefore, includes at least one resource block 510. As shown, time is depicted along the horizontal dimension as the abscissa axis, and frequency is depicted along the vertical dimension as the ordinate axis. The air interface resource 502, as defined by a given wireless communication protocol or standard, may span any suitable specified frequency range and/or may be divided into intervals of any specified duration. Increments of time can correspond to, for example, milliseconds (m Sec.). Increments of frequency can correspond to, for example, megahertz (MHz).

In example operations generally, the base stations 120 and/or a ground station 190 (not illustrated) allocate portions (e.g., resource units 504) of the air interface resource 502 for uplink and downlink communications. Each resource block 510 of network access resources may be allocated to support respective wireless communication links 130 (wireless links 130) of multiple UE 110. In aspects, a base station 120/ground station 190 may schedule one or more resource blocks to a UE 110/satellite 160 in accordance with aspects of repetitive communications for improving reliability of satellite communications. In the upper-left corner of the grid, the resource block 513 may span, as defined by a given communication protocol, a first frequency range and/or bandwidth 506 and include multiple sub carriers or frequency sub-bands. In a similar manner, the resource block 514 spans the first frequency range and/or bandwidth 506. The resource block 513 and the resource block 514 may each include any suitable number of subcarriers (e.g., 12) that each corresponds to a respective portion (e.g., 15 kHz) of the specified frequency range or bandwidth 506 (e.g., 180 kHz). In a similar manner, the resource blocks 512 and 515 may span a second frequency range and/or bandwidth 507, and the resource blocks 511 and 516 may span a third frequency range and/or bandwidth 508.

The resource blocks 511, 512, and 513 may also span, as defined by the given communication protocol, a first specified time interval 520 or time slot (e.g., lasting approximately one-half millisecond or 7 orthogonal frequency-division multiplexing (OFDM) symbols in conformance with 3GPP 5G NR standards, numerology 1). The time interval 520 includes subintervals that may each correspond to a symbol, such as an OFDM symbol. In a similar manner, the resource blocks 514, 515, and 516 span a second specified time interval 522. For explanation purposes, the time intervals shown are common across the frequency bandwidths, but implementations may define different time intervals for each frequency bandwidth. As shown in FIG. each resource block 510 may include multiple resource elements 524 (REs) that correspond to, or are defined by, a subcarrier of a frequency range and/or bandwidth (e.g., frequency range and/or bandwidth 507) and a subinterval (or symbol) of a time interval (e.g., the time interval 522). Alternatively, a given resource element 524 may span more than one frequency subcarrier or symbol. Thus, a resource unit 504 may include at least one resource block 510, at least one resource element 524, and so forth.

In aspects of repetitive communications for improving reliability of satellite communications, a first wireless network, such as a terrestrial-based communication network (e.g., RAN 140), has access to a first set of communication resources, such as the resource blocks 513 and 514. In a similar manner, a second wireless network, such as a satellite communication system (e.g., SAN 170), has access to a second set of communication resources, such as the resource blocks 512 and 515. As another example, a third wireless network has access to a third set of communication resources, such as the resource blocks 511 and 516.

The frequency ranges and/or bandwidths 506 and 507 are separated by a gap or guard band 526, while the frequency ranges and/or bandwidths 507 and 508 are separated by a gap or guard band 528. The frequency bandwidth and/or time duration of the guard band 526 and/or the guard band 528 can correspond to any size of partitioning. As one non-limiting example, the frequency bandwidth of the gap or guard bands 526 and 528 each correspond to a frequency bandwidth associated with a resource element (e.g., RE 524) as shown.

The frequency range and/or bandwidths 506 and 507 are adjacent and the frequency ranges and/or bandwidths 507 and 508 are adjacent based on not being separated by another frequency bandwidth that is occupied by another wireless network. However, the frequency range and/or bandwidth 506 is not adjacent to the frequency range and/or bandwidth 508 based on being separated by the frequency range and/or bandwidth 507 that is occupied by the second wireless network.

Repetitive Communications for Improving Reliability of Satellite Communications

A UE may experience difficulties establishing and/or maintaining a wireless link with a satellite due to various factors that adversely impact signal quality, such as Doppler shifts and/or time shifts in the received wireless signals due to moving satellites, regulated power density, constrained space for hardware in the UE, and so forth. For example, because of regulatory limitations that seek to mitigate interference, satellite communication systems typically experience low SNR due to propagation loss and power density limitations. Poor signal quality may result in unreliable communications (e.g., dropped calls, bit errors). Repetitive communications may improve reliability of communications within the satellite communication system.

FIG. 6 illustrates an example environment 600 in which aspects of repetitive communications for improving reliability of satellite communications can be implemented. In this example, the environment 600 includes the UE 110, the satellite 160, and the ground station 190 of FIG. 1. The example environment 600 also includes the base station 120, the terrestrial core network 150, and the non-terrestrial core network 155 of FIG. 1, which may be excluded in some aspects of repetitive communications for improving reliability of satellite communications. Generally, the UE 110 communicates with the satellite 160 via a wireless link 133, and the satellite 160 communicates with the ground station 190 through the interface 182. In some aspects, the ground station 190 communicates with any combination of the non-terrestrial core network 155 (e.g., through the interface 196), the terrestrial core network 150 (e.g., through the non-terrestrial core network 155 and the interfaces 196 and 106, the interface 108), and/or the base station 120 (e.g., through the interface 193, through the terrestrial core network 150 and the interface 108 and/or the non-terrestrial core network 155 and the interfaces 196 and 106). The satellite 160, the ground station 190, and/or the non-terrestrial core network 155 form a non-terrestrial communication system that communicates with the UE 110 in the environment 600.

The satellite 160 and the UE 110 communicate over the wireless link 133 using repetitive communications for any of data channel communications, control channel communications, reference signaling, or the like. For example, the satellite 160 uses repetitive communications to transmit on physical downlink shared channel (PDSCH), physical downlink control channel (PDCCH), broadcast control channel (BCCH), common control channel (CCCH), dedicated control channel (DCCH), paging control channel (PCCH), to transmit synchronization signal block (SSB) components, channel state information reference signals (CSI-RS), demodulation reference signal (DMRS), or the like. Alternatively or additionally, the UE 110 uses repetitive communications for transmissions on the physical uplink shared channel (PUSCH) and/or physical uplink control channel (PUCCH), for sounding reference signal (SRS), demodulation reference signal (DMRS), and/or physical random access channel (PRACH) transmissions, random access channel (RACH), or the like. This can include the satellite 160 and/or the UE 110 using different repetition configurations for the repetitive communications over each logical channel (e.g., a first repetition configuration for PDSCH communications, a second repetition configuration for PDCCH communications, a third repetition configuration for PUSCH communications, a fourth repetition configuration for PUCCH communications).

In aspects, the satellite 160 and the UE 110 establish the wireless link 133 using repetitive communications. For example, the satellite 160 semi-statically broadcasts one or more initial-access repetition configurations in a system information block (SIB) for initial access procedure uplink communications and/or downlink communications. Alternatively or additionally, the satellite 160 indicates, in the broadcast information, whether repetitive communications are enabled or disabled for the initial access procedure communications. This can include implicit indications that repetitive communications are enabled/disabled (e.g., a presence of the repetition configurations implies enabled, an absence (e.g., a lack of presence) of the repetition configurations implies disabled) or explicit indications (e.g., a toggle flag). The UE 110 recovers the initial-access repetition configurations and, when repetitive communications are enabled, transmits one or more uplink communications and/or processes one or more downlink communications in accordance with the initial-access repetition configurations as further described. In aspects, the satellite 160 receives the initial-access repetition configurations from the ground station 190 and/or the non-terrestrial core network 155 via the interface 182, or determines the initial-access repetition configuration using the satellite repetition module 324. The satellite 160, the ground station 190, and/or the non-terrestrial core network 155 may select the initial-access repetition configurations without dynamic input from the UE 110, such as by using default repetition configurations and/or by accessing historical records of repetition configurations based on ephemeris data associated with the satellite 160. However, in some aspects, the satellite 160, the ground station 190, and/or the non-terrestrial core network 155 dynamically select repetition configurations using assistance information from the UE 110. As one example, the UE 110 communicates the assistance information to the satellite 160, as further described with reference to FIG. 9. As another example, the non-terrestrial communication system receives the assistance information from the UE 110 by way of the base station 120 (e.g., the interface 193, the terrestrial core network 150, and the interfaces 102/104/106/108). To illustrate, assume the UE 110 and the base station 120 communicate over the wireless link 131 of FIG. 1 (not shown in FIG. 6). The base station 120 may obtain assistance information from the UE 110 over the wireless link 131 and forward the assistance information to the non-terrestrial communication system, which can occur before or after the UE 110 establishes a connection to the satellite 160.

A repetition configuration designates one or more repetition factors to use for the repetitive communications. To illustrate, and as described with reference to FIGS. 7 and 8, the repetition configurations designate any combination of a frequency-domain repetition factor, a code-domain repetition factor, and/or a time-domain repetition factor. For example, with reference to a frequency-domain repetition factor, the non-terrestrial communication system (e.g., the satellite 160, the ground station 190, the non-terrestrial core network 155) partitions a total bandwidth of 800 MHz (e.g., in the Ka band) into smaller bandwidth segments (e.g., 50 MHz). In determining and/or selecting a repetition configuration, the non-terrestrial communication system determines a frequency-domain repetition factor that designates a number of bandwidth segments and/or specific bandwidth segments for the repetition configuration. While the above example describes segmenting a frequency bandwidth, the satellite 160 and the UE 110 may utilize similar mechanisms for time-domain repetitive communications (e.g., designating a number of time durations for multiple repetitive transmissions) and/or code-domain repetitive communications (e.g., designating a number of channel codes for multiple repetitive transmissions). Determining a repetition configuration may be based on any combination of factors, such as a channel type (e.g., control channel, data channel, logical channel), satellite location, ephemeris data, historical records, downlink SNR, UE battery level, UE transmit power, a data or link QoS level, a UE RRC state, and so forth.

As one example of repetitive communications, assume the non-terrestrial communication system assigns a repetition configuration to downlink communications. In accordance with the repetition configuration, the satellite 160 retransmits a downlink communication in each specific bandwidth segment (e.g., using multiple repetitive downlink transmissions). For instance, downlink communication 602 includes multiple repetitive downlink transmissions, where the satellite 160 repeats transmission of the downlink communication in a first bandwidth segment 604, a second bandwidth segment 606, and a third bandwidth segment 608. The UE 110 monitors each specific bandwidth segment (e.g., the bandwidth segments 604, 606, and 608) for a respective transmission in accordance with the frequency-domain repetition factors specified in the repetition configuration. The UE 110 demodulates and combines the respective transmissions (e.g., each respective signal received in the respective bandwidth segment) to improve signal quality (e.g., to improve SNR, and/or to mitigate fading effects) and, subsequently, reliability in the downlink communication. To illustrate, the UE 110 decodes the combined (demodulated) signal, which has a higher SNR relative to a single transmission and improves the UE's ability to successfully recover information and/or data from the downlink communication. Alternatively or additionally, the repetitive communications use repetitive transmissions based on a time-domain repetition factor as described with reference to FIGS. 7 and 8 and/or based on a code-domain repetition factor.

In aspects, the UE 110 demodulates and combines fewer (received) repetitive transmissions than transmitted by the satellite 160. As one example, the UE 110 determines an observed received-power metric for each repetitive transmission in each bandwidth segment and determines to demodulate and combine only the repetitive transmissions that meet or exceed a threshold value (e.g., an SNR threshold value), such as by determining to demodulate and combine two out of five repetitive transmissions. As another example, the UE 110 selects one of multiple (repetitive) transmissions with an observed received-power metric that exceeds the threshold value and/or has the highest observed received-power metric out of the multiple transmissions and demodulates and decodes the one transmission. Processing fewer received repetitive transmissions relative to the total transmitted repetitive transmissions can be helpful in various scenarios, such as when the UE 110 has a low battery power level or the UE has an antenna with a limited size and/or not properly oriented to receive the total number of transmitted repetitive transmissions. To illustrate, processing fewer (received) repetitive transmissions reduces a number of computations performed by the UE 110 and preserves battery power. Processing a single repetitive transmission that meets and/or exceeds the threshold value, while ignoring and/or omitting the other repetitive transmissions from the processing, also preserves battery power and eliminates needless or unnecessary computations. This also helps preserve processing resources for other tasks. These techniques may alternatively or additionally be used for time-domain repetitive transmissions and/or code-domain repetitive transmissions. When the non-terrestrial communication system assigns a repetition configuration to uplink communications, the UE 110 and the satellite 160 transmit and monitor the uplink communications in a reciprocal manner.

The satellite 160, ground station 190, non-terrestrial core network 155, terrestrial core network 150, and/or base station 120 may determine repetition configurations, while the UE 110 may similarly determine UE-selected repetition factors, based on any suitable conditions or parameters, which may include UE location, satellite location, downlink SNR, UE battery level, UE transmit power, a data or link QoS level, ephemeris data, historical records, a UE RRC state, UE-observed SNR of downlink transmissions from the satellite, channel type (e.g., control channel, data channel, logical channel), and so forth. As one example, with respect to channel type, the non-terrestrial communication system selects a first repetition configuration for PDCCH communications that uses fewer repetitive transmissions relative to a second repetition configuration for PDSCH communications because PDCCH transmissions use a lower modulation and coding scheme (MCS) that results in more reliable transmissions. The different repetition configurations for different physical and/or logical channels allow the non-terrestrial communication system to select (or the UE to request) repetition configurations that help conserve power at the UE 110 by reducing the repetitive communications/transmissions on channels with more inherent reliability and reducing the processing at the UE.

The non-terrestrial communication system and/or the UE 110 may dynamically configure and/or reconfigure the repetition configurations, such as by the UE 110 communicating assistance information to the non-terrestrial communication system (e.g., the satellite 160). The UE 110, for instance, may identify that the UE 110 has changed (or is scheduled to change) to a different RRC state (e.g., has changed from an RRC_CONNECTED state to an RRC_IDLE state or an RRC_INACTIVE state, or has changed from the RRC_IDLE/RRC_INACTIVE state to the RRC_CONNECTED state) and generates assistance information that includes UE-selected repetition factors based on the changing RRC state as further described with reference to FIG. 2 to conserve energy. Alternatively or additionally, the UE 110 specifies a logical channel associated with the UE-selected repetition factors. For instance, the UE 110 specifies a repetition factor for monitoring a paging channel while operating in the RRC_IDLE state. As another example, the UE 110 may forward an indication of a low battery power level to the satellite 160, which triggers the non-terrestrial communication system to generate and return new repetition configurations that conserve power at the UE 110. As another example of dynamically configuring the repetition configuration, the satellite 160 may dynamically communicate a PDSCH-repetition configuration using repetitive communications on the PDCCH, where the repetitive communications on the PDCCH use a different PDCCH-repetition configuration relative to the PDSCH-repetition configuration. The UE 110 recovers the PDSCH-repetition configuration by demodulating and decoding the PDCCH and dynamically updates recovering PDSCH communications in accordance with the PDSCH-repetition configuration. In some aspects, such as when the satellite 160 and the UE 110 have established the wireless link 133, the satellite 160 multicasts and/or unicasts repetition configurations to the UE 110.

In some aspects, the UE 110 dynamically requests an increase or decrease in repetitive communications (via the assistance information) based on how well the UE recovers data and/or information from downlink transmissions (e.g., bit errors, observed SNR). To illustrate, the UE 110 measures an observed SNR and determines to increase one or more repetition factors if the observed SNR falls below a first SNR threshold value and/or determines to decrease one or more repetition factors if the observed SNR meets or exceeds a second SNR threshold value or successfully recovers the data/information using one repetitive transmission. Alternatively or additionally, the UE 110 reports the observed SNR to the non-terrestrial communication system, and the non-terrestrial communication system dynamically reconfigures the repetitive communications as further described with reference to FIG. 9. This can include the UE 110 requesting the repetitive communications be enabled and/or disabled.

Figure 7:
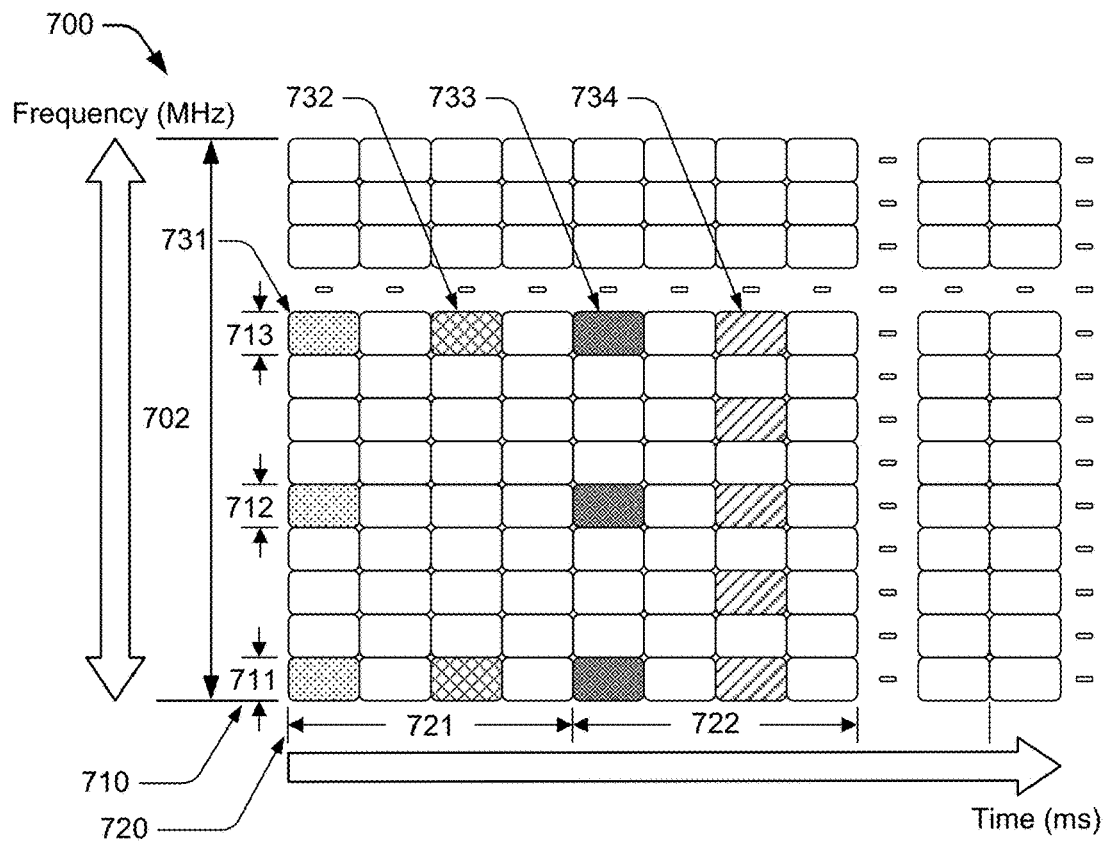
FIG. 7 illustrates examples of bandwidth segments and repetitive communications implemented in accordance with various aspects of repetitive communications for improving reliability of satellite communications.
Figure 7:
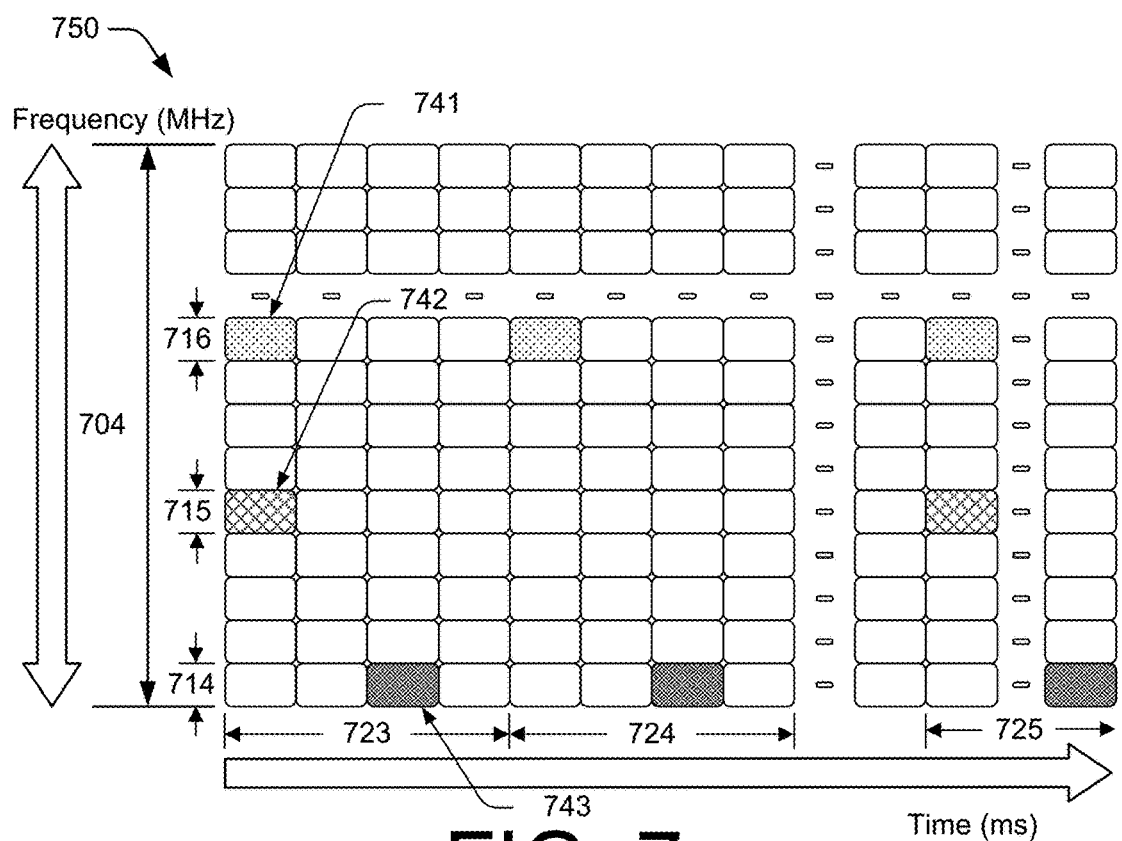

FIG. 7 illustrates examples of bandwidth segments and repetitive communications implemented in accordance with various aspects of repetitive communications for improving reliability of satellite communications. Generally, the example bandwidth segments at 700 illustrate repetitive communications across multiple bandwidth segments (e.g., repetition across frequency), and the example bandwidth segments at 750 illustrate repetitive communications across multiple transmission time intervals (TTIs). In aspects, any entity of the non-terrestrial communication system (e.g., UE 110, satellite 160, or ground station 190) may configure or coordinate with another entity of the system to configure the bandwidth segments, TTIs, or repetition factors to implement repetitive communication. These illustrations of bandwidth segments (e.g., 700, 750, or 800 of FIG. 8) may represent repetition configurations or repetition factors for either uplink or downlink communications.

As shown at 700, a bandwidth 702 (e.g., a total bandwidth) of a frequency range is partitioned into multiple bandwidth segments 710, each of which may include same or different amounts of frequency bandwidth. For example, the ground station 190 or GS repetition module 370 of FIG. 3 can determine a repetition configuration in which a bandwidth of 800 MHz is partitioned into 16 separate 50 MHz bandwidth segments. In aspects, the ground station (e.g., non-terrestrial base station) configures parameters for repetitive communications (e.g., repetition factors) based on conditions of the UE or the satellites (e.g., position, velocity, atmosphere) and/or types of data or control information or signals being communicated. In some cases, the ground station configures respective repetition factors in the repetition configurations differently for different types of uplink or downlink channels. For example, the ground station can configure a PDCCH for fewer repetitions while configuring a PDSCH for more repetitions. By so doing, this may assist in reducing UE power consumption for PDCCH monitoring.

Figure 8:
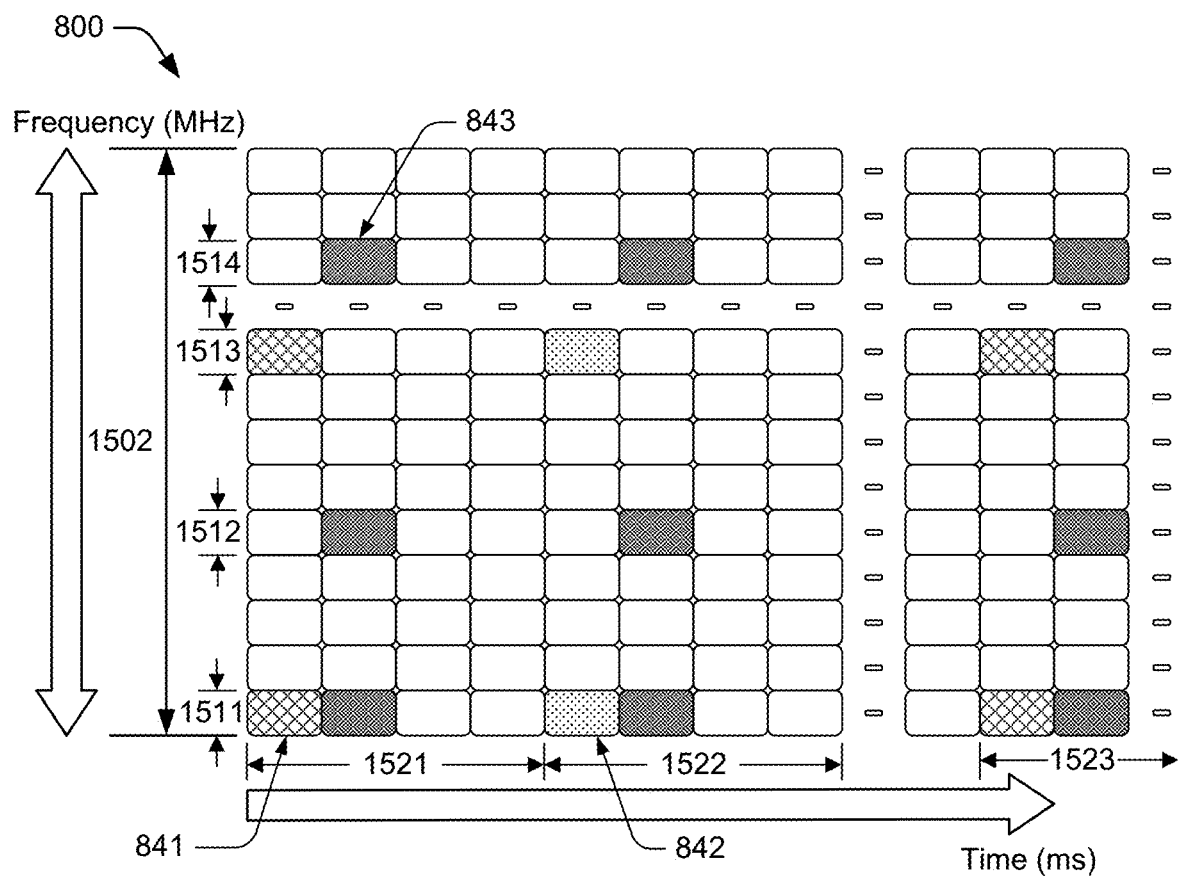
FIG. 8 illustrates another example of bandwidth segments and repetitive communications implemented in accordance with various aspects of repetitive communications for improving reliability of satellite communications.

The wireless link between the UE 110 and the satellite 160 may also be divided along the time axis into scalable (e.g., configurable) TTIs 720 (e.g., TTIs 721 and 722) for time-based repetition as described with respect to example 750 and 800 of FIG. 8. With reference to example 700, the bandwidth segments include 711, 712, and 713, over which the UE 110 or satellite 160 may implement repetitive uplink or downlink communications. As noted, various logical channels may be configured with different repetition factors, which may enable different levels of power conservation, reliability improvements, or the like. In the context of the present example, the ground station 190 configures respective repetition factors such that a PDCCH communication 731 repeats over three bandwidth segments (e.g., bandwidth segments 711, 712, and 713), an SSB communication 732 repeats over two bandwidth segments, a CSI-RS communication 733 repeats over three bandwidth segments, and a PDSCH communication 734 repeats over five bandwidth segments. Although shown as communications at separate times (e.g., time slots), the repetitive communications may occur during a same time slot such that different repetition factors (e.g., by two, by three, by four, and so on) are implemented concurrently on same or different bandwidth segments (e.g., PDCCH and PDSCH repetitions on the same bandwidth segment).

With reference to example 750, entities of the satellite communication system may implement repetitive communications in the time domain as well, where ground station 190, satellite 160, or UE 110 can repeat the data or control communications from one time-interval (TTI) across multiple time intervals (TTIs) without any intervening repeat request such as HARQ feedback. In aspects, the UE 110 and ground station 190 can communicate using time-domain repetition factors that are determined based on satellite and UE locations, UE observed SNRs, or the like. In this example, the bandwidth 704 is partitioned into bandwidth segments 714, 715, and 716, over which the UE 110 or satellite 160 may implement repetitive uplink or downlink communications. Additionally, the resources of the wireless link include TTI 723, TTI 724, and TTI 725 in the time domain. As noted, various logical channels may be configured with different repetition factors, which may enable different levels of power conservation, reliability improvements, or the like. In the context of the present example, the ground station 190 configures respective repetition factors such that a PDCCH communication 741 repeats over three TTIs (e.g., TTIs 723, 724, and 725), an SSB communication 742 repeats over two TTIs, and a PDSCH communication 743 repeats over three TTIs. Although shown as communications in separate bandwidth segments, the repetitive communications may occur in a same bandwidth segment such that communications with different time repetition factors (e.g., each TTI, every other TTI, every third TTI, and so on) are implemented concurrently on same or different bandwidth segments (e.g., PDCCH and PDSCH repetitions over a single bandwidth segment use the same TTI repetition factor).

FIG. 8 illustrates another example of bandwidth segments and repetitive communications implemented in accordance with various aspects of repetitive communications for improving reliability of satellite communications. In some aspects, the satellite communication system applies aspects of repetitive communications across both time and frequency domains to further improve reliability. In this example, the bandwidth 802 is partitioned into bandwidth segments 811, 812, 813, and 814, over which the UE 110 or satellite 160 may implement repetitive uplink or downlink communications. Additionally, the resources of the wireless link include TTI 821, TTI 822, and TTI 823 in the time domain. As noted, various logical channels may be configured with different repetition factors, which may enable different levels of power conservation, reliability improvements, or the like. In the context of the present example, the ground station 190 configures respective repetition factors such that communications are repeated in both frequency and time domains. As shown in FIG. 8, a PDCCH communication 841 repeats over two bandwidth segments (e.g., bandwidth segments 811 and 813) during every other TTI (e.g., TTI 821, TTI 823), an SSB communication 842 repeats over two bandwidth segments (e.g., bandwidth segments 811 and 813) during every third TTI (e.g., TTI 822 and subsequent TTIs, not shown), and a PDSCH communication 843 repeats over three bandwidth segments (e.g., the bandwidth segment 811, the bandwidth segment 812, the bandwidth segment 814) on every TTI (e.g., TTI 821, TTI 822, TTI 823). Although shown as communications in separate bandwidth segments or TTIs, the repetitive communications may occur in a same bandwidth segment such that communications for logical channels with different repetition factors (e.g., each TTI, every other TTI, two bandwidth segments, three bandwidth segments, and so on) are implemented concurrently on same or different bandwidth segments (e.g., PDCCH and PDSCH repetitions on the same or overlapping bandwidth segments with the same TTI).

Figure 9:
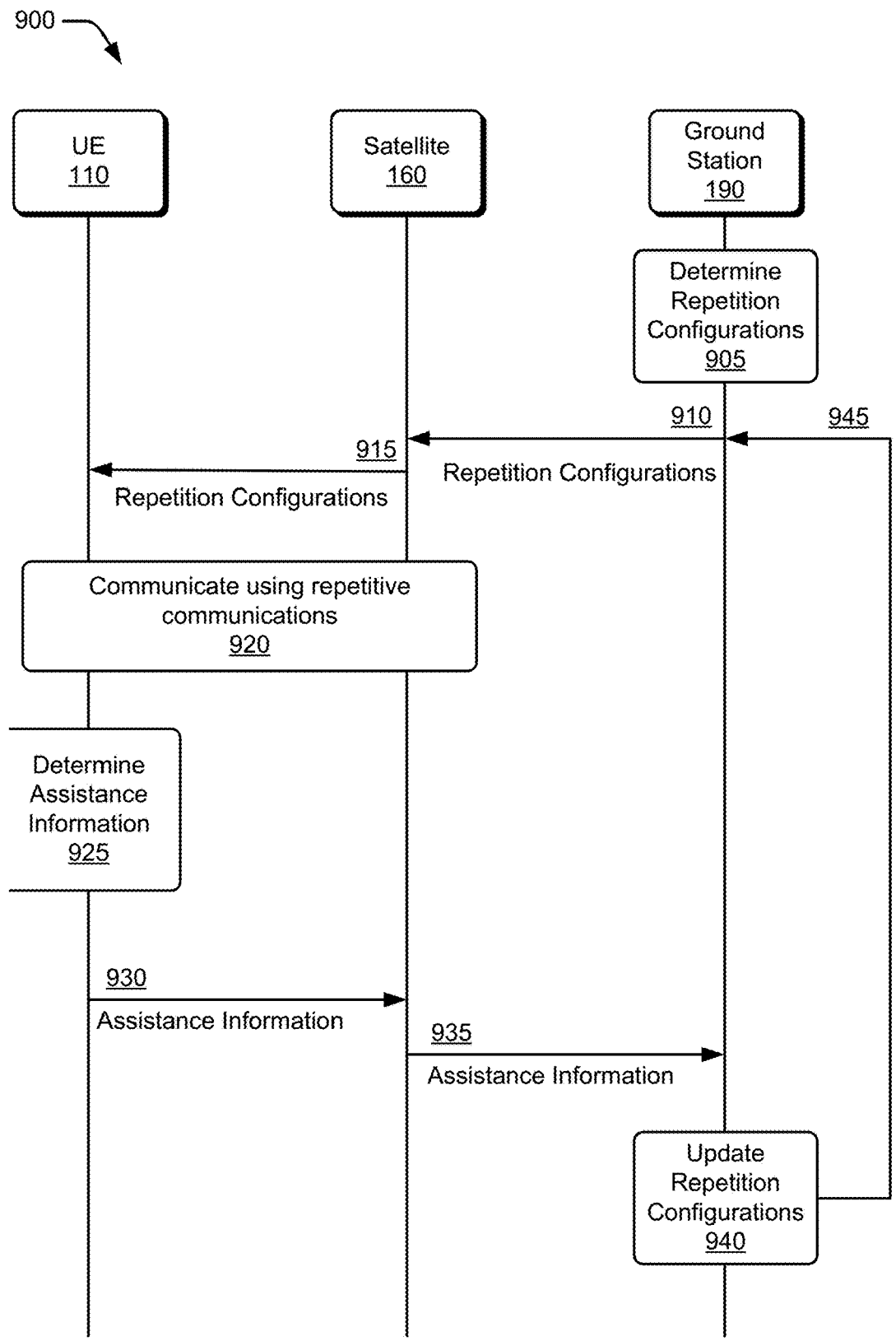
FIG. 9 illustrates an example signaling and control transaction diagram that can be used to perform aspects of repetitive communications for improving reliability of satellite communications.

FIG. 9 illustrates an example signaling transaction diagram 900 that includes a combination of actions, signaling transactions, and/or control transactions that can be used to perform aspects of repetitive communications for improving reliability of satellite communications. In some aspects, the transactions described with reference to the diagram 900 are implemented using the UE 110, the satellite 160, and/or the ground station 190 of FIG. 1.

At 905, the ground station 190 (or satellite with ground station functionalities) determines one or more repetition configurations for the satellite 160. The ground station uses any combination of information to determine the repetition configurations, such as those described with reference to FIGS. 3 and 6. In some aspects, the ground station 190 determines repetition configurations used by the satellite to perform initial access procedures with UEs requesting access to the non-terrestrial communication system. This can include the ground station 190 determining a frequency-domain repetition factor, a time-domain repetition factor, and/or a code-domain repetition factor for the repetition configurations as further described with reference to FIGS. 3 and 6-8. Alternatively or additionally, the ground station 190 determines respective repetition configurations for different physical and/or logical channels, as well as downlink and uplink communications. In some aspects, the ground station 190 determines repetition configurations used for RACH/PRACH communications during an initial access procedure. While the diagram 900 shows the ground station 190 determining the repetition configurations, the repetition configurations may be alternatively determined by (in) the non-terrestrial core network 155, the terrestrial core network 150, and/or the base station 120 (not shown in FIG. 9) as described with reference to FIG. 6 and communicated to the ground station 190, or (ii) the satellite 160, such as in scenarios in which the satellite 160 includes base station functionality (e.g., a gNode B, a Distributed Unit (DU)).

At 910, the ground station 190 sends the repetition configuration(s) to the satellite 160, such as by using the interface 182 of FIGS. 1 and 6. In some aspects, such as when the satellite 160 includes base station functionality that determines the repetition configuration(s), this transaction may be optional.

At 915, the satellite 160 communicates one or more repetition configurations to the UE 110. As one example, such as during an initial access procedure, the satellite 160 semi-statically broadcasts the repetition configurations and/or an indication of whether repetitive communications are enabled/disabled as further described with reference to FIGS. 2, 3, and 6 and the UE 110 recovers the repetition configurations from the broadcast message. As another example, such as when the non-terrestrial communication system dynamically configures and/or reconfigures the repetition configurations (e.g., as shown at 945), the satellite 160 multicasts and/or unicasts the repetition configuration(s) to the UE 110.

At 920, the UE 110 and the satellite 160 communicate using repetitive communications. For example, the UE 110 transmits PRACH/RACH communications in accordance with a first repetition configuration obtained at 915. The UE 110, for instance, transmits an uplink communication using multiple repetitive uplink transmissions in one or more frequency-domain bandwidth segments, one or more time-domain time durations, and/or using one or more channel codes and the satellite 160 monitors the corresponding bandwidth segment, time durations, and/or channel codes to recover the uplink communication. Alternatively or additionally, the satellite 160 transmits a downlink communication using multiple repetitive downlink transmissions in accordance with a repetition configuration, and the UE 110 monitors the corresponding bandwidth segments, time durations, and/or channel codes to recover the downlink communication. In some aspects, the UE 110 indirectly communicates with the ground station 190 through the satellite 160, where the satellite 160 relays messages between the UE 110 and the ground station 190 (e.g., in a manner similar to that shown at 930 and at 935 for an uplink communication, in a manner similar to that shown at 910 and 915 for a downlink communication).

At 925, the UE 110 determines assistance information. For example, the assistance information may include a UE location, UE-observed SNRs for wireless signals from the satellite 160, mobility characteristics of the UE, or the like. The UE may also determine UE-selected repetition factors based on conditions at the UE, such as UE battery level, UE data-rate requirements, or a UE radio resource control (RRC) state (e.g., idle, connected, inactive), and include the UE-selected repetition factors in the assistance information. In some cases, the UE generates assistance information that indicates a request to reduce repetition factor(s) or turn off repetitive communications when fewer repetitions are sufficient for the UE to successfully decode the signals, when the UE battery level is low, or when the UE transitions to an RRC_IDLE or RRC_INACTIVE state. Conversely, the UE generates assistance information that indicates a request to turn on repetitive communications or increase repetition factor(s) when the UE cannot successfully decode signals (e.g., for specific logic channels or for all communications addressed to that UE), connects to a charger, or transitions to an RRC_CONNECTED state.

At 930, the UE 110 transmits assistance information to the satellite 160, which may or may not forward the assistance information to the ground station 190, as shown at 935. For example, in a bent-pipe architecture in which the ground station 190 includes base station functionalities and the satellite 160 acts as a relay, the UE 110 sends (e.g., using an indirect communication) the assistance information to the ground station 190 through the satellite 160 as shown at 930 and at 935. As another example, when the satellite 160 includes ground station functionalities (e.g., gNB-DU functions or a satellite with a collocated base station), the UE 110 sends the assistance information to a repetition module (e.g., the satellite repetition module 324) on the satellite 160 that reconfigures the repetition configurations as further described with reference to FIG. 6. In other words, the satellite 160 may determine and communicate repetition configurations to the UE 110 without communicating to the ground station 190.

At 940, the ground station 190 updates one or more repetition configurations based on the assistance information from the UE 110 using any combination of information as further described with reference to FIGS. 3 and 6. However, in alternative or additional implementations, the ground station 190 forwards the assistance information to the non-terrestrial core network 155, the terrestrial core network 150, and/or the base station 120 (not shown), which generate and return updated repetition configuration(s) to the ground station 190.

At 945, various transactions described by the diagram 900 may iteratively repeat. For example, the ground station 190 communicates updated repetition configurations to the satellite 160 at 910, the satellite 160 communicates the updated repetition configurations to the UE 110 at 915, and the UE 110 communicates with the satellite 160 using the updated repetition configurations at 920. The UE 110 may also update or redetermine the assistance information. For example, responsive to UE movement, atmospheric (e.g., weather) changes, battery level changes, a change in UE RRC state, or a change in SNR, the UE 110 may reevaluate conditions for using repetitive communication, generate updated assistance information, and communicate the updated assistance information to the satellite 930.

Repetitive communications (by way of repetitive transmissions) allow a UE and/or a satellite to demodulate and combine the respective transmissions to improve signal quality (e.g., improve SNR, mitigate fading effects) and, subsequently, reliability in recovering information and/or data in the communication. This also provides a mechanism that may be implemented by devices with constrained space and smaller form factors that limit hardware implementations. Further, some communication frameworks, such as orthogonal frequency division multiple access (OFDMA) frameworks, can improve reliability using repetitive communications without extensive hardware and/or software changes.

Example Methods for Multi-UE-Communication Transmissions Using APDs

Figure 10:
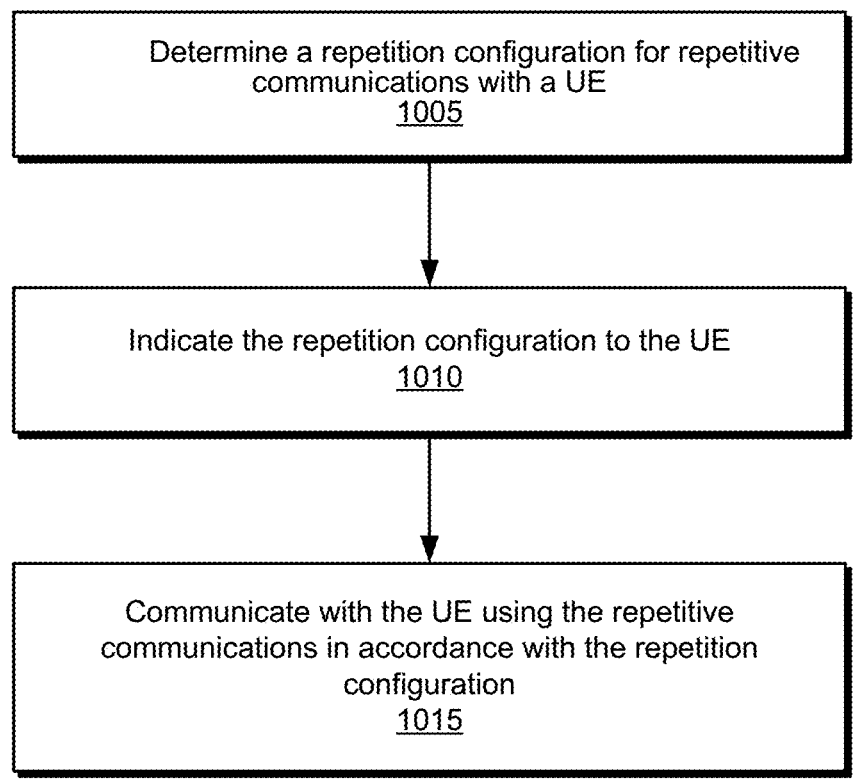
FIG. 10 illustrates a first example method in accordance with various aspects of repetitive communications for improving reliability of satellite communications.
Figure 11:
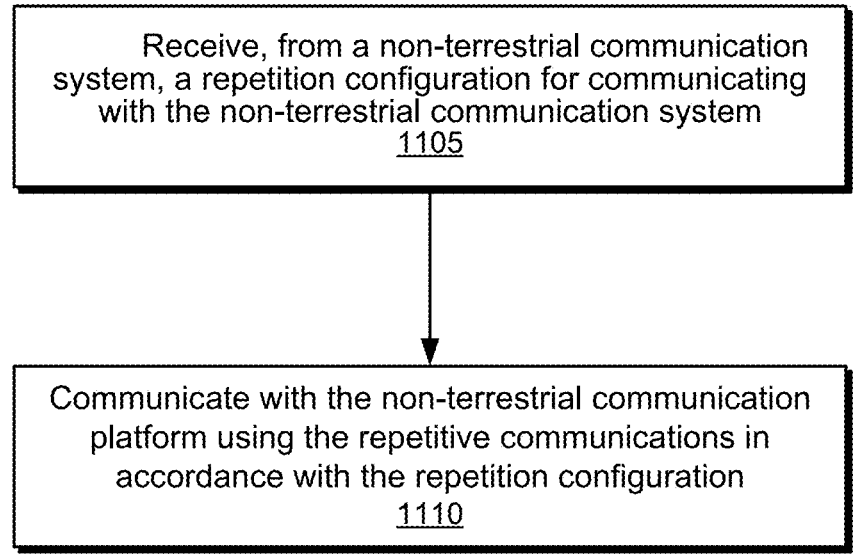
FIG. 11 illustrates a second example method in accordance with various aspects of repetitive communications for improving reliability of satellite communications.

Example methods 1000 and 1100 are described with reference to FIGS. 10 and 11 in accordance with one or more aspects of repetitive communications for improving reliability of satellite communications. The example method 1000 used to perform aspects of repetitive communications for improving reliability of satellite communications may be performed by one or more entities of a non-terrestrial communication system, such as a satellite (e.g., satellite 160), a ground station (e.g., the ground station 190) and/or a non-terrestrial core network (e.g., the non-terrestrial core network 155). At 1005, a non-terrestrial communication system determines a repetition configuration for repetitive communications with a user equipment UE. As one example, a ground station (e.g., the ground station 190) determines a repetition configuration for communications between a satellite in the non-terrestrial communication system (e.g., the satellite 160) and a user equipment (e.g., the UE 110) as described at 905 of FIG. 9 and with reference to FIGS. 3 and 6. As another example, such as when the satellite includes base station functionality as described with reference to FIGS. 3 and 6, the satellite (e.g., the satellite 160) determines the repetition configuration. The non-terrestrial communication system may determine multiple repetition configurations for different physical channels, logical channels, downlink communication, uplink communications, and so forth.

At 1010, the non-terrestrial communication system indicates the repetition configuration to the UE. For instance, such as in a bent-pipe architecture, the ground station (e.g., the ground station 190) indirectly indicates the repetition to the UE (e.g., the UE 110) through the satellite (e.g., the satellite 160) as described at 910 and at 915 of FIG. 9. In some aspects, a satellite that includes base station functionality directly communicates the repetition configuration to the UE, such as through broadcast, multicast, and/or unicast messages as described with reference to FIGS. 6 and 9.

At 1015, the non-terrestrial communication system communicates with the UE using the repetitive communications in accordance with the repetition configuration. To illustrate, the satellite (e.g., the satellite 160) transmits a downlink communication to the UE (e.g., the UE 110) using multiple repetitive downlink transmissions in accordance with the repetition confirmation as described at 920 of FIG. 9. Alternatively or additionally, the satellite (e.g., the satellite 160) monitors for an uplink communication from the UE (e.g., the UE 110) by monitoring for multiple repetitive uplink transmissions in accordance with the repetition configuration as described at 920 of FIG. 9. In some aspects, the ground station communicates indirectly with the UE through the satellite, such that the satellite relays an uplink and/or a downlink communication between the ground station (e.g., the ground station 190) and the UE (e.g., the UE 110) as described at 920 of FIG. 9.

The example method 1100 used to perform aspects of repetitive communications for improving reliability of satellite communications may be performed by a user equipment, such as the UE 110 of FIG. 1. At 1105, a UE receives, from a non-terrestrial communication system, a repetition configuration for communicating with the non-terrestrial communication system. As one example, the UE (e.g., the UE 110) receives the repetition from a satellite in the non-terrestrial communication system (e.g., the satellite 160) in a broadcast message, a multicast message, and/or a unicast message as described at 915 of FIG. 9. In some aspects, the UE 110 uses the repetition configuration to perform an initial access procedure with the satellite 160 as described with reference to FIG. 6. Alternatively or additionally, the UE provides assistance information to the non-terrestrial communication system as described at 925, 930, and 935 of FIG. 9, and the non-terrestrial communication system provides a repetition configuration based on the assistance information at 1105 as described at 945 of FIG. 9.

At 1110, the UE communicates with the non-terrestrial communication system using the repetitive communications in accordance with the repetition configuration. To illustrate, the UE (e.g., the UE 110) transmits an uplink communication to the satellite (e.g., the satellite 160) using multiple repetitive uplink transmissions in accordance with the repetition confirmation as described at 920 of FIG. 9. Alternatively or additionally, the UE (e.g., the UE 110) monitors for a downlink communication from the satellite (e.g., the satellite 160) by monitoring multiple repetitive downlink transmissions in accordance with the repetition configuration as described at 920 of FIG. 9. In some aspects, the satellite relays an uplink and/or downlink communication between the ground station (e.g., the ground station 190) and the UE (e.g., the UE 110) as described at 920 of FIG. 9.

The order in which the method blocks of the methods 1000 and 1100 are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-Chip systems (SoCs), Complex Programmable Logic Devices (CPLDs), and the like.

Although aspects of repetitive communications for improving reliability of satellite communications have been described in language specific to features and/or methods, the subject matter of this disclosure is not necessarily limited to the specific features or operations described. Rather, the specific features and methods are disclosed as example implementations of repetitive communications for improving reliability of satellite communications, and other equivalent features and operations are intended to be within the scope of the described subject matter. It is to be appreciated that each described aspect can be implemented independently or in connection with one or more other described aspects.

In the following, several examples are described:

Example 1: A method performed by a non-terrestrial communication system for communicating with a user equipment, UE, the method comprising: determining a repetition configuration for repetitive communications with the UE; indicating the repetition configuration to the UE; and communicating with the UE using the repetitive communications in accordance with the repetition configuration.

Example 2: The method as recited in example 1, wherein determining the repetition configuration comprises at least one of: determining a frequency-domain repetition factor by partitioning a first frequency bandwidth into multiple, smaller bandwidth segments and selecting at least two bandwidth segments from the multiple, smaller bandwidth segments, for the repetitive communications; determining a code-domain repetition factor by selecting at least two channel codes for the repetitive communications; or determining a time-domain repetition factor selecting at least two transmission time intervals, TTIs, for the repetitive communications.

Example 3: The method as recited in example 2, wherein communicating with the UE using the non-terrestrial communication system and the repetitive communications in accordance with the repetition configuration comprises: repeating transmission of a downlink communication in accordance with the repetition configuration; or receiving an uplink communication in accordance with the repetition configuration.

Example 4: The method as recited in example 3, wherein the repetition configuration includes the frequency-domain repetition factor, and, wherein communicating with the UE comprises: repeating transmission of the downlink communication in each bandwidth segment of the at least two bandwidth segments; or receiving the uplink communication in at least one bandwidth segment of the at least two bandwidth segments.

Example 5: The method as recited in example 4, wherein receiving the uplink communication from the UE further comprises: monitoring the at least two bandwidth segments for the uplink communication.

Example 6: The method as recited in any one of examples 1 to 5, wherein determining the repetition configuration further comprises: selecting the repetition configuration based upon a current radio resource control state, RRC state, of the UE.

Example 7: The method as recited in any one of examples 1 to 6, wherein the repetition configuration is a first repetition configuration, the method further comprising: determining the first repetition configuration for a control channel communication; and determining a second, different repetition configuration for a data channel communication.

Example 8: The method as recited in example 7, wherein determining the first repetition configuration further comprises: selecting a lower repetition factor for the first repetition configuration relative to the second, different repetition configuration.

Example 9: The method as recited in any one of examples 1 to 8, determining the repetition configuration comprises: obtaining a satellite location; and determining the repetition configuration using the satellite location.

Example 10: The method as recited in any one of examples 1 to 9, further comprising: receiving assistance information from the UE, and wherein determining the repetition configuration for repetitive communications comprises: determining the repetition configuration using the assistance information.

Example 11: The method as recited in example 10, wherein receiving the assistance information further comprises: receiving a first indication to turn off the repetitive communications; receiving a second indication to reduce a repetition factor; or receiving a third indication to increase the repetition factor.

Example 12: The method as recited in example 10, wherein determining the repetition configuration using the assistance information comprises: obtaining at least a first UE-selected repetition factor from the assistance information; and determining the repetition configuration using the first UE-selected repetition factor.

Example 13: The method as recited in example 12 further comprising: receiving directions to use the first UE-selected repetition factor for control channel communications; obtaining a second UE-selected repetition factor from the assistance information; and receiving directions to use the second UE-selected repetition factor for data channel communications.

Example 14: The method as recited in any one of examples 10 to 13, wherein receiving the assistance information further comprises: receiving at least one of: a UE location; or a UE-observed signal-to-noise ratio, SNR.

Example 15: The method as recited in any one of examples 1 to 14, wherein indicating the repetition configuration further comprises one of: broadcasting the repetition configuration to the UE; multicasting the repetition configuration to the UE; or unicasting the repetition configuration to the UE.

Example 16: A method performed by a user equipment, UE, for communicating with a non-terrestrial communication system using repetitive communications, the method comprising: receiving, from the non-terrestrial communication system, a repetition configuration for communicating with the non-terrestrial communication system using repetitive transmissions; and communicating with the non-terrestrial communication system using the repetitive communications in accordance with the repetition configuration.

Example 17: The method as recited in example 16, wherein receiving the repetition configuration comprises: receiving one or more repetition factors for performing the repetitive communications, the repetition factors comprising at least one of: a frequency-domain repetition factor that specifies at least two bandwidth segments of a partitioned frequency bandwidth; a code-domain repetition factor that specifies at least two channel codes; or a time-domain repetition factor that indicates at least two transmission time intervals, TTIs.

Example 18: The method as recited in example 17, wherein communicating with the non-terrestrial communication system using the repetitive transmissions in accordance with the repetition configuration comprises: transmitting the repetitive transmissions to the non-terrestrial communication system in accordance with the one or more repetition factors, the repetitive transmissions comprising repeated transmission of an uplink communication; or receiving the repetitive transmissions from the non-terrestrial communication system in accordance with the one or more repetition factors, the repetitive transmissions comprising repeated transmission of a downlink communication.

Example 19: The method as recited in example 18, wherein the one or more repetition factors includes the frequency-domain repetition factor, and wherein communicating with the non-terrestrial communication system comprises: repeating transmission of the uplink communication in each bandwidth segment of the at least two bandwidth segments; or receiving the downlink communication in at least one bandwidth segment of the at least two bandwidth segments.

Example 20: The method as recited in example 19, wherein receiving the downlink communication from the non-terrestrial communication system further comprises: monitoring the at least two bandwidth segments for the downlink communication.

Example 21: The method as recited in any one of examples 16 to 20, wherein the repetition configuration is a first repetition configuration, and wherein receiving the repetition configuration comprises: receiving a first indication to use the first repetition configuration for control channel communications; receiving a second, different repetition configuration; and receiving a second indication to use the second, different repetition configuration for data channel communications.

Example 22: The method as recited in any one of examples 16 to 21, further comprising: generating assistance information; and communicating the assistance information to the non-terrestrial communication system.

Example 23: The method as recited in example 22, wherein generating the assistance information further comprises: determining one or more UE-selected repetition factors, the one or more UE-selected repetition factors comprising at least one of: a UE-selected frequency repetition factor; a UE-selected code-domain repetition factor; or a UE-selected time-domain repetition factor.

Example 24: The method as recited in example 22 or 23, wherein generating the assistance information further comprises: including, in the assistance information, directions to use the one or more UE-selected repetition factors for control channel communications or data channel communications.

Example 25: The method as recited in any one of examples 22 to 24, wherein generating the assistance information further comprises: including, in the assistance information, at least one of: a UE location; or a UE-observed signal-to-noise ratio, SNR.

Example 26: The method as recited in example 22, further comprising: determining to disable repetitive communications, and wherein generating the assistance information further comprises: including, in the assistance information, a request to disable repetitive communications.

Example 27: The method as recited in example 26, wherein determining to disable the repetitive communications further comprises: generating a UE-observed signal-to-noise ratio, SNR, based on communications with the non-terrestrial communication system; determining the UE-observed SNR meets or exceeds an SNR threshold value; and determining to disable the repetitive communications based on determining the SNR meets or exceeds the SNR threshold value.

Example 28: The method as recited in example 26, wherein determining to disable the repetitive communications further comprises: identifying that a UE battery power level falls below a battery-power-level threshold value for battery power levels; and determining to disable the repetitive communications based on identifying the UE battery power level falls below the battery-power-level threshold value.

Example 29: The method as recited in any one of examples 16 to 28, wherein receiving the repetition configuration further comprises one of: receiving the repetition configuration in a broadcast communication; receiving the repetition configuration in a multicast communication; or receiving the repetition configuration in a unicast communication.

Example 30: An apparatus comprising: at least one processor; and computer-readable storage media comprising instructions, responsive to execution by the at least one processor, for directing the apparatus to perform a method as recited in any one of examples 1 to 29.

What is claimed is:

1. A method performed by a non-terrestrial communication system for communicating with a user equipment (UE) the method comprising:

determining, by a ground station of the non-terrestrial communication system, a repetition configuration for repetitive communications with the UE, the determining of the repetition configuration including at least one of:
  (i) obtaining a satellite location; and
    determining the repetition configuration using the satellite location; or
  (ii) receiving assistance information from the UE; and
    determining the repetition configuration for repetitive communications using the assistance information;
indicating the repetition configuration to the UE; and
communicating with the UE using the repetitive communications in accordance with the repetition configuration.

2. The method as recited in claim 1, wherein determining the repetition configuration comprises at least one of:
  determining a frequency-domain repetition factor by partitioning a first frequency bandwidth into multiple, smaller bandwidth segments and selecting at least two bandwidth segments from the multiple, smaller bandwidth segments, for the repetitive communications;
  determining a code-domain repetition factor by selecting at least two channel codes for the repetitive communications; or
  determining a time-domain repetition factor by selecting at least two transmission time intervals (TTIs) for the repetitive communications.

3. The method as recited in claim 2, wherein communicating with the UE using the non-terrestrial communication system and the repetitive communications in accordance with the repetition configuration comprises:
  repeating transmission of a downlink communication in accordance with the repetition configuration; or
  receiving an uplink communication in accordance with the repetition configuration.

4. The method as recited in claim 3, wherein the repetition configuration includes the frequency-domain repetition factor, and,
  wherein communicating with the UE using the repetitive communications further comprises:
    repeating transmission of the downlink communication in each bandwidth segment of the at least two bandwidth segments.

5. The method as recited in claim 3, wherein receiving the uplink communication from the UE further comprises:
  monitoring the at least two bandwidth segments for the uplink communication.

6. The method as recited in claim 1, wherein the determining of the repetition configuration further comprises:
  selecting the repetition configuration based upon a current radio resource control (RRC) state of the UE.

7. The method as recited in claim 1, wherein determining the repetition configuration comprises receiving the assistance information from the UE, and
  wherein receiving the assistance information further comprises one of:
    receiving a first indication to turn off the repetitive communications;
    receiving a second indication to reduce a repetition factor; or
    receiving a third indication to increase the repetition factor.

8. The method as recited in claim 7, wherein determining the repetition configuration using the assistance information comprises:

obtaining at least a first UE-selected repetition factor from the assistance information; and
determining the repetition configuration using the first UE-selected repetition factor.

9. A method performed by a user equipment (UE) for communicating with a non-terrestrial communication system using repetitive communications, the method comprising:
transmitting assistance information to the non-terrestrial communication system;
receiving, from the non-terrestrial communication system, a repetition configuration for communicating with the non-terrestrial communication system using repetitive transmissions, the repetition configuration based on the assistance information; and
communicating with the non-terrestrial communication system using the repetitive transmissions in accordance with the repetition configuration.

10. The method as recited in claim 9, wherein receiving the repetition configuration comprises:
receiving one or more repetition factors for performing the repetitive communications, the repetition factors comprising at least one of:
a frequency-domain repetition factor that specifies at least two bandwidth segments of a partitioned frequency bandwidth;
a code-domain repetition factor that specifies at least two channel codes; or
a time-domain repetition factor that indicates at least two transmission time intervals (TTIs).

11. The method as recited in claim 10, wherein communicating with the non-terrestrial communication system using the repetitive transmissions in accordance with the repetition configuration comprises:
transmitting the repetitive transmissions to the non-terrestrial communication system in accordance with the one or more repetition factors, the repetitive transmissions comprising repeated transmission of an uplink communication; or
receiving the repetitive transmissions from the non-terrestrial communication system in accordance with the one or more repetition factors, the repetitive transmissions comprising repeated transmission of a downlink communication.

12. The method as recited in claim 11, wherein the one or more repetition factors includes the time-domain repetition factor, and
wherein communicating with the non-terrestrial communication system comprises:
repeating transmission of the uplink communication in at least one bandwidth segment of the at least two bandwidth segments; or
receiving the downlink communication in at least one bandwidth segment of the at least two bandwidth segments.

13. The method as recited in claim 9, wherein the transmitting comprises:
generating the assistance information which includes one or more UE-selected repetition factors, the one or more UE-selected repetition factors comprising at least one of:
a UE-selected frequency repetition factor;
a UE-selected code-domain repetition factor; or
a UE-selected time-domain repetition factor.

14. The method as recited in claim 9, further comprising:
determining to disable repetitive communications, and
communicating, to the non-terrestrial communication system, a request to disable repetitive communications.

15. The method as recited in claim 9, wherein the receiving, from the non-terrestrial communication system, the repetition configuration comprises:
receiving the repetition configuration for communicating on a data channel; or
receiving the repetition configuration for communicating on a control channel.

16. A non-terrestrial communication system comprising:
at least one processor; and
computer-readable storage media comprising instructions, responsive to execution by the at least one processor, for directing a ground station of the non-terrestrial communication system to:
determine a repetition configuration for repetitive communications with a user equipment (UE), the determination of the repetition configuration including at least one of:
(i) obtain a satellite location; and
determine the repetition configuration using the satellite location; or
(ii) receive assistance information from the UE; and
determine the repetition configuration for repetitive communications using the assistance information;
indicate the repetition configuration to the UE; and
communicate with the UE using the repetitive communications in accordance with the repetition configuration.

17. The non-terrestrial communication system of claim 16, wherein the instructions to determine the repetition configuration are executable to:
determine a frequency-domain repetition factor by partitioning a first frequency bandwidth into multiple, smaller bandwidth segments and selecting at least two bandwidth segments from the multiple, smaller bandwidth segments, for the repetitive communications;
determine a code-domain repetition factor by selecting at least two channel codes for the repetitive communications; or
determine a time-domain repetition factor by selecting at least two transmission time intervals (TTIs) for the repetitive communications.

18. The non-terrestrial communication system of claim 17, wherein the repetition configuration includes the frequency-domain repetition factor, and,
wherein the communication with the UE using the repetitive communications further directs the UE to:
repeat transmission of an uplink communication in each bandwidth segment of the at least two bandwidth segments; or
receive a downlink communication in at least one bandwidth segment of the at least two bandwidth segments.

19. The non-terrestrial communication system of claim 18, wherein the instructions to receive the uplink communication from the UE are further executable to:
monitor the at least two bandwidth segments for the uplink communication.

20. The method as recited in claim 13, further comprising:
transmitting a request for repetitive communication of control channel communications to the non-terrestrial communication system; or
transmitting a request for repetitive communication of data channel communications to the non-terrestrial communication system.

* * * * *